US011632796B2

(12) United States Patent
Abotabl et al.

(10) Patent No.: US 11,632,796 B2
(45) Date of Patent: Apr. 18, 2023

(54) UPLINK CANCELATION-ASSISTED LISTEN-BEFORE-TALK FOR FULL-DUPLEX BASE STATION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 17/224,498

(22) Filed: Apr. 7, 2021

(65) Prior Publication Data

US 2022/0330333 A1 Oct. 13, 2022

(51) Int. Cl.
*H04W 74/08* (2009.01)
*H04L 5/14* (2006.01)
*H04W 72/04* (2023.01)
*H04W 72/0453* (2023.01)

(52) U.S. Cl.
CPC .......... *H04W 74/0808* (2013.01); *H04L 5/14* (2013.01); *H04W 72/0453* (2013.01)

(58) Field of Classification Search
CPC ......... H04W 74/0808; H04W 72/0406; H04W 72/042; H04W 72/1268; H04W 72/044; H04W 72/0446; H04W 72/0453; H04W 72/10; H04W 72/1215; H04W 72/1242; H04W 72/1247; H04W 72/14; H04L 1/08; H04L 1/1812; H04L 1/1854; H04L 5/14
See application file for complete search history.

(56) References Cited

U.S. PATENT DOCUMENTS

| 2017/0079060 | A1* | 3/2017 | Keating | H04W 72/0406 |
| 2018/0332579 | A1* | 11/2018 | Kang | H04L 5/14 |
| 2021/0218503 | A1* | 7/2021 | Babaei | H04L 1/1812 |
| 2022/0232545 | A1* | 7/2022 | Mukherjee | H04W 74/0808 |

* cited by examiner

*Primary Examiner* — Awet Haile
(74) *Attorney, Agent, or Firm* — Procopio, Cory, Hargreaves & Savitch LLP

(57) ABSTRACT

The apparatus may be a UE configured to communicate, in a FD mode, with at least one base station via an unlicensed spectrum; determine to cancel at least one UL transmission corresponding to one or more UL resources, the one or more UL resources corresponding to a LBT procedure; and cancel, based on the determination, the at least one UL transmission corresponding to the one or more UL resources. The apparatus may be a base station configured to communicate, in a FD mode, with one or more UEs via an unlicensed spectrum; determine that a LBT procedure associated with DL scheduling will occur via a set of UL resources; and transmit, to the one or more UEs based on the determination, an indication of a cancelation of one or more UL transmissions during the set of UL resources.

30 Claims, 14 Drawing Sheets

UPLINK CANCELATION-ASSISTED LISTEN-BEFORE-TALK FOR FULL-DUPLEX BASE STATION

BACKGROUND

Technical Field

The present disclosure relates generally to communication systems, and more particularly, to uplink (UL) cancelation-assisted listen-before-talk (LBT) for a full-duplex (FD) capable base station and user equipment (UE).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5 G New Radio (NR). 5 G NR is part of a continuous mobile broadband evolution promulgated by Third Generation Partnership Project (3 GPP) to meet new requirements associated with latency, reliability, security, scalability (e.g., with Internet of Things (IoT)), and other requirements. 5 G NR includes services associated with enhanced mobile broadband (eMBB), massive machine type communications (mMTC), and ultra-reliable low latency communications (URLLC). Some aspects of 5 G NR may be based on the 4 G Long Term Evolution (LTE) standard. There exists a need for further improvements in 5 G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects of wireless communication, e.g., 5 G NR, a base station and a UE may communicate via an unlicensed spectrum (e.g., unlicensed frequency band) as discussed above. However, in an unlicensed spectrum, a base station or UE may perform a LBT procedure to detect if another device (e.g., not the base station or UE) is using (e.g., transmitting over) the unlicensed spectrum. The LBT procedure may measure an energy in a set of RBs (or RB groups) that make up a LBT bandwidth to determine whether an energy in each of the sets of RBs is above (or below) a threshold. Based on the measured (or detected) energy, the base station or UE performing the LBT procedure determines whether (1) the channel is occupied and another LBT procedure is necessary or (2) the channel is unoccupied (available) and a transmission is allowed.

In an aspect of the disclosure, a method, a computer-readable medium, and an apparatus are provided. The apparatus may be a device at a UE. The device may be a processor and/or modem at a UE or the UE itself. The UE may be configured to communicate, in a FD mode, with at least one base station. The FD communication may be via an unlicensed spectrum/band. The UE may also be configured to receive, from the at least one base station, an indication of a cancelation of the at least one UL transmission. The UE may further be configured to determine to cancel at least one UL transmission corresponding to one or more UL resources, the one or more UL resources corresponding to a LBT procedure. The UE may further be configured to cancel, based on the determination, the at least one UL transmission corresponding to the one or more UL resources. In some aspects, the UE may further be configured to receive, from the at least one base station, an indication of a cancelation of at least one additional UL transmission, the at least one additional UL transmission corresponding to one or more additional UL resources, the one or more additional UL resources corresponding to one of a subsequent LBT procedure or a prior LBT procedure. The UE may additionally be configured to determine, based on a priority of the at least one additional UL transmission, not to cancel the at least one additional UL transmission. The UE may also be configured to transmit, based on the determination, the at least one additional UL transmission corresponding to the one or more additional UL resources.

In an aspect of the disclosure, a method, a computer-readable medium, and an apparatus are provided. The apparatus may be a device at a base station. The device may be a processor and/or modem at a base station or the base station itself. The base station may be configured to communicate, in a FD mode, with one or more UEs. The base station may also be configured to determine that a LBT procedure associated with downlink (DL) scheduling will occur via a set of UL resources. The base station may further be configured to transmit, to the one or more UEs based on the determination, an indication of a cancelation of one or more UL transmissions during the set of UL resources. The base station may also be configured to perform the LBT procedure via the set of UL resources. The base station may further be configured to transmit, to the one or more UEs, an indication of a cancelation of at least one additional UL transmission, the at least one additional UL transmission corresponding to one or more additional UL resources, the one or more additional UL resources corresponding to one of a subsequent LBT procedure or a prior LBT procedure. The base station may additionally be configured to receive, from the one or more UEs, the at least one additional UL transmission corresponding to the one or more additional UL resources.

In an aspect of the disclosure, a method, a computer-readable medium, and an apparatus are provided. The apparatus may be a device at a base station. The device may be a processor and/or modem at a base station or the base station itself. The base station may be configured to To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
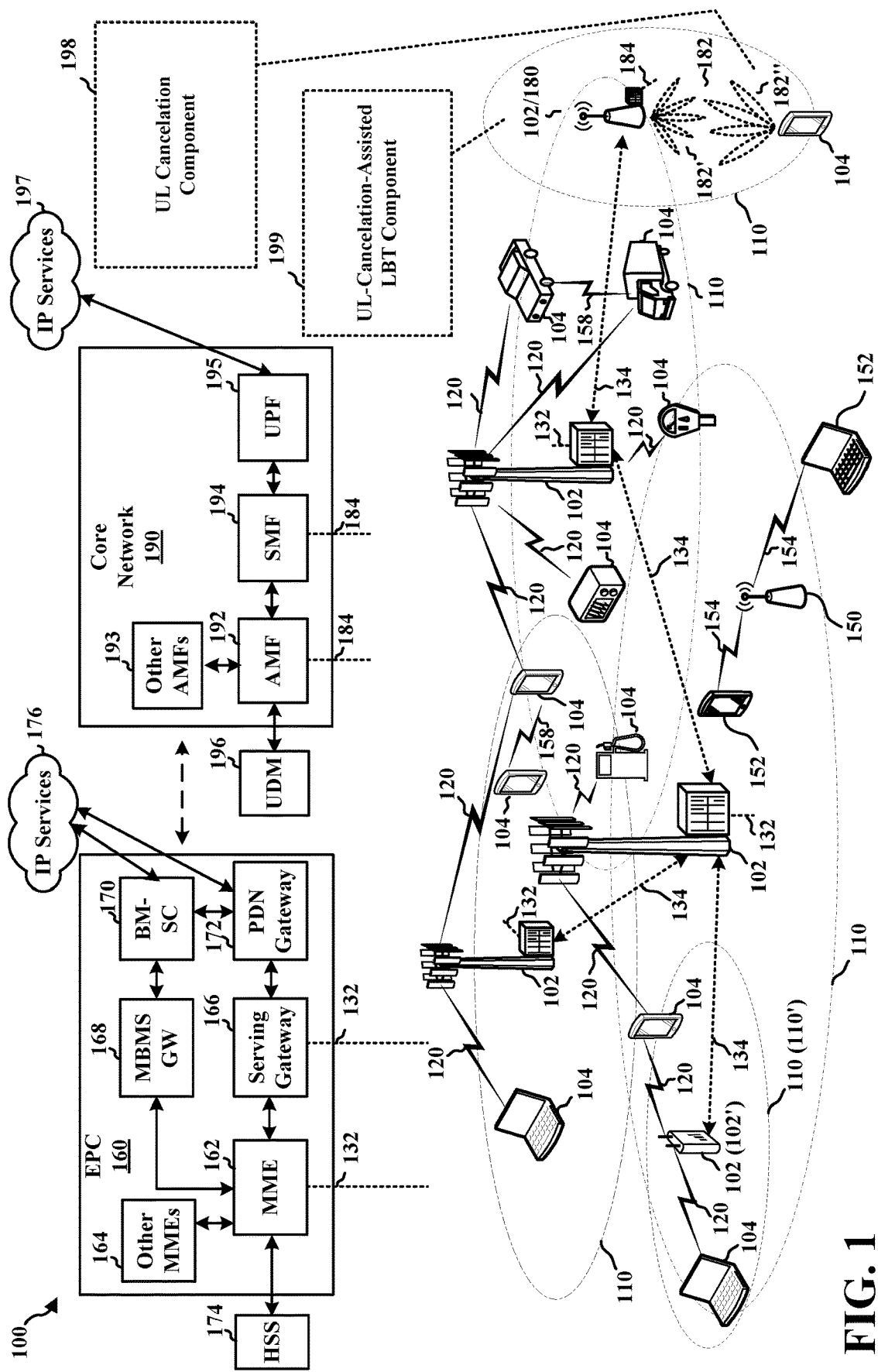
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5 G Core (5 GC)). The base stations 102 may include macrocells (high power cellular base station) and/or small cells (low power cellular base station). The macrocells include base stations. The small cells include femtocells, picocells, and microcells.

The base stations 102 configured for 4 G LTE (collectively referred to as Evolved Universal Mobile Telecommunications System (UMTS) Terrestrial Radio Access Network (E-UTRAN)) may interface with the EPC 160 through first backhaul links 132 (e.g., 51 interface). The base stations 102 configured for 5 G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5 G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5 G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5 G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an UL cancelation component 198 that may be configured to communicate, in a FD mode, with at least one base station; determine to cancel at least one UL transmission corresponding to one or more UL resources, the one or more UL resources corresponding to a LBT procedure; and cancel, based on the determination, the at least one UL transmission corresponding to the one or more UL resources. In certain aspects, the base station 180 may include an UL-cancelation-assisted LBT component 199 that may be configured to communicate, in a FD mode, with one or more UEs; determine that a LBT procedure associated with DL scheduling will occur via a set of UL resources; and transmit, to the one or more UEs based on the determination, an indication of a cancelation of one or more UL transmissions during the set of UL resources. Although the following description may be focused on 5 G NR, the concepts described herein may be applicable to other similar areas, such as LTE, LTE-A, CDMA, GSM, and other wireless technologies.

Figure 2:
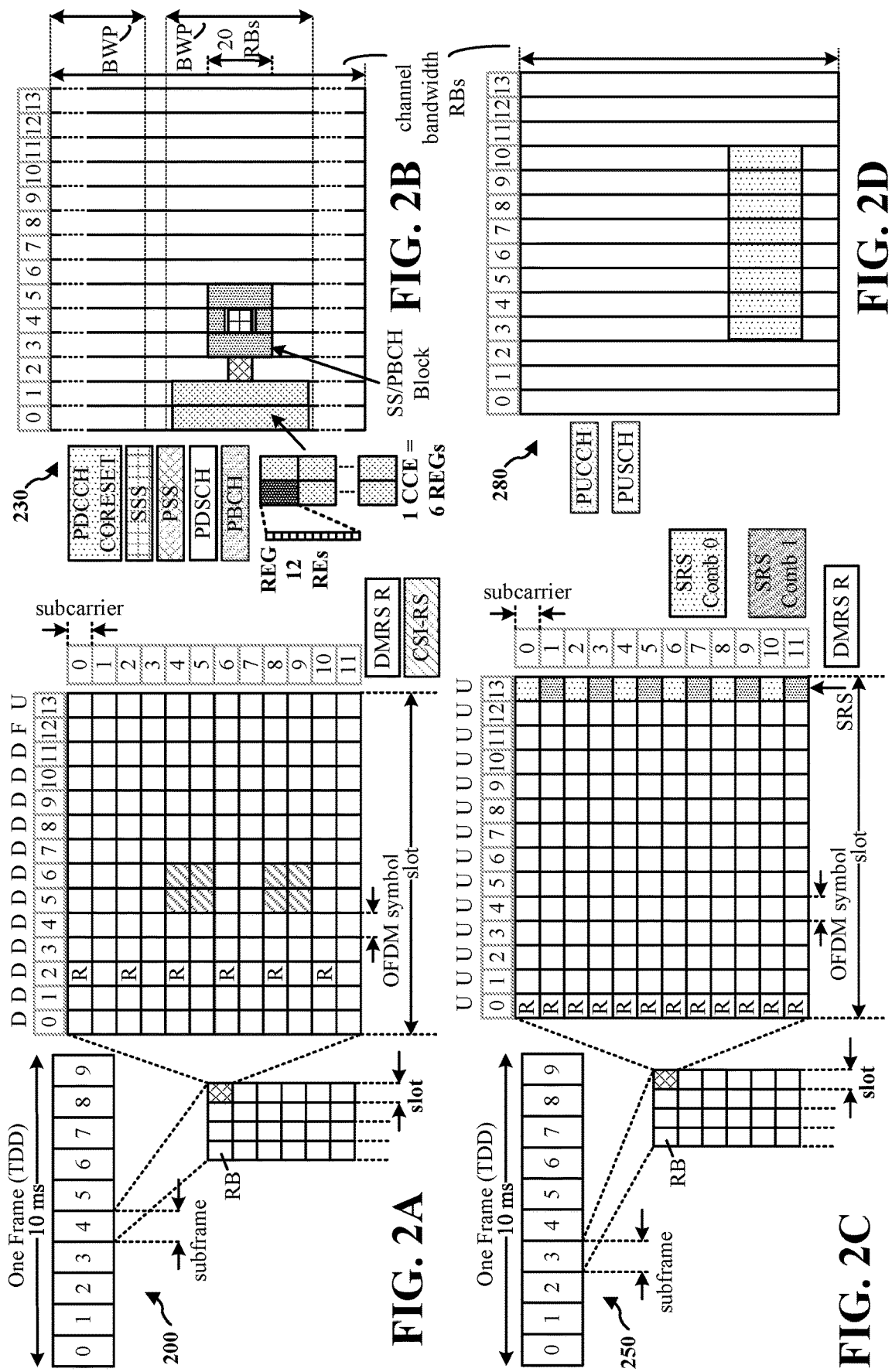
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5 G NR frame structure. FIG. 2B is a diagram 230 illustrating an example of DL channels within a 5 G NR subframe. FIG. 2C is a diagram 250 illustrating an example of a second subframe within a 5 G NR frame structure. FIG. 2D is a diagram 280 illustrating an example of UL channels within a 5 G NR subframe. The 5 G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5 G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5 G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
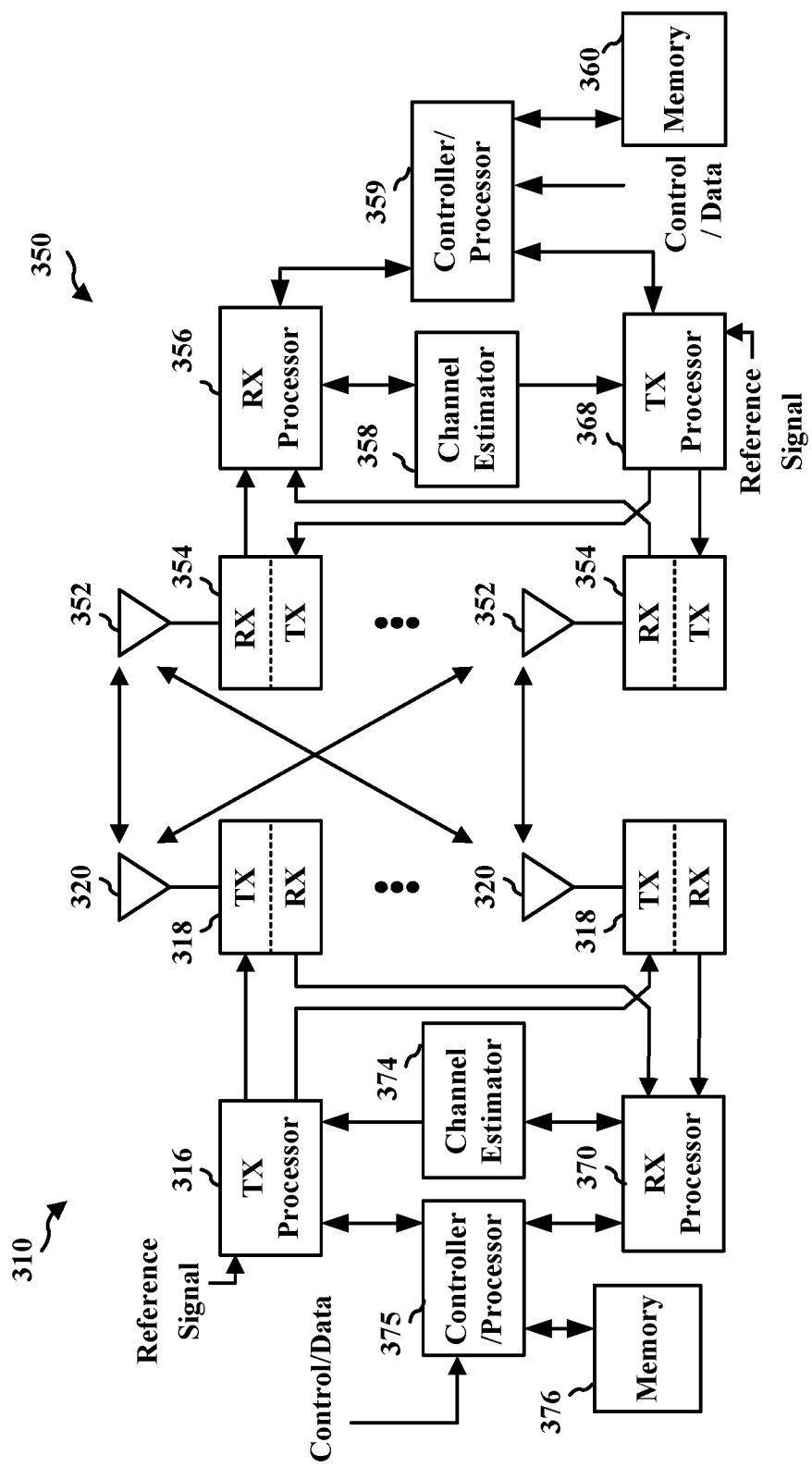
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

Figure 4:
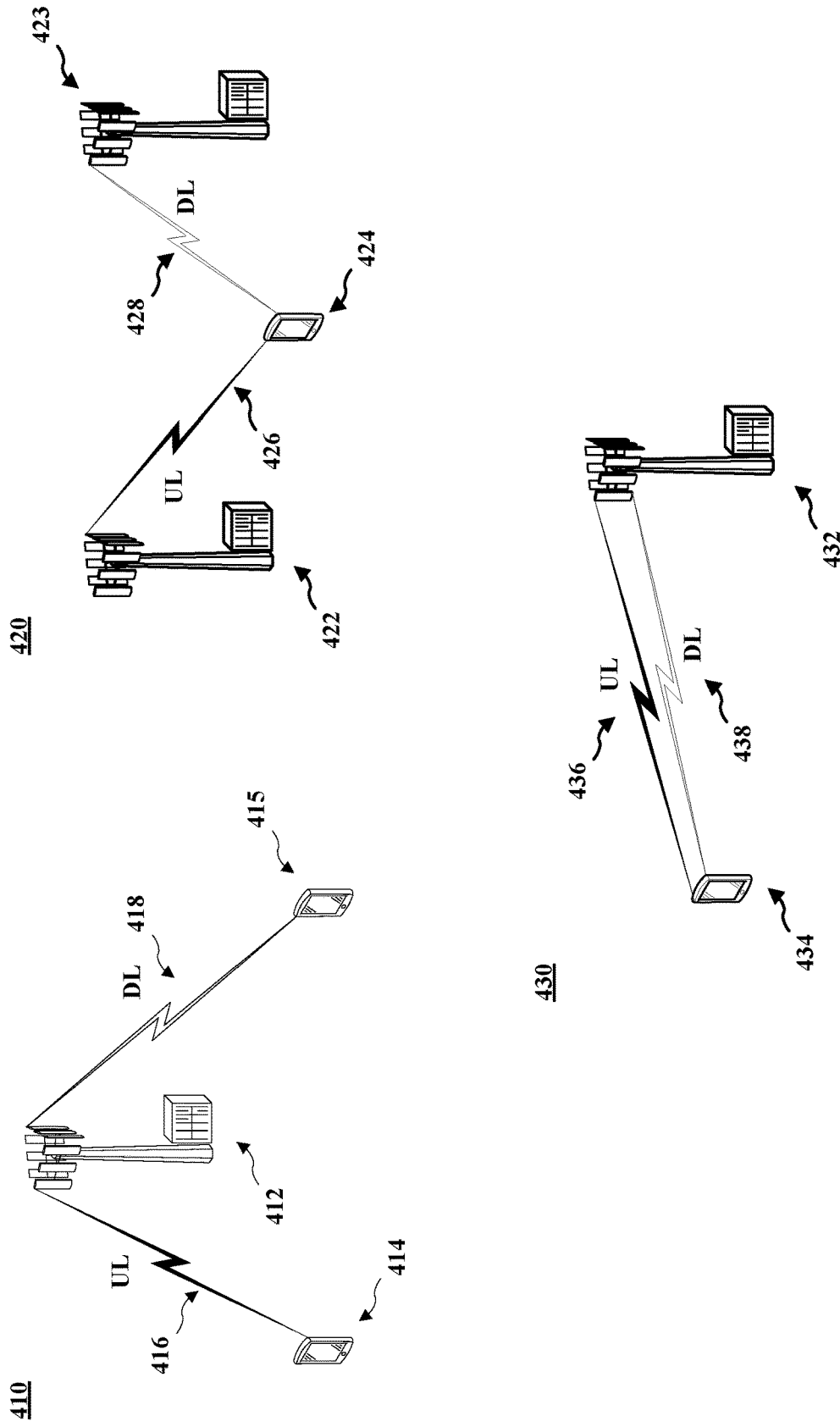
FIG. 4 is a set of diagrams illustrating a base station engaging in FD communication, a UE engaging in FD communication, and both a base station and a UE engaging in FD communication.

In certain aspects of wireless communication, e.g., 5 G NR, one or both of a base station and a UE may engage in FD communication. FIG. 4 is a set of diagrams 410, 420, and 430 illustrating a base station 412 engaging in FD communication, a UE 424 engaging in FD communication, and both a base station 432 and a UE 434 engaging in FD communication. Diagram 410 illustrates a base station 412 engaging in FD communication. Specifically, the base station 412 transmits DL data 418 to a first UE 414 and receives UL data 416 from a second UE 415 at a same time. The UL data 416 received by the base station and the DL data 418 transmitted by the base station may result in self-interference at the base station (e.g., interference between the UL data reception and the DL data transmission).

Diagram 420 illustrates a UE 424 engaging in FD communication. Specifically, the UE 424 transmits UL data 426 to a first base station 422 and receives DL data 428 from a second base station 423 at a same time. The UL data 426 transmitted by the UE and the DL data 428 received by the UE may result in self-interference at the UE (e.g., interference between the UL data transmission and the DL data reception). Diagram 430 illustrates a UE 434 and a base station 432 engaging in FD communication with each other. The base station 432 (and the UE 434) may experience self-interference between the UL data reception (transmission) 436 and the DL data transmission (reception) 438.

Figure 5:
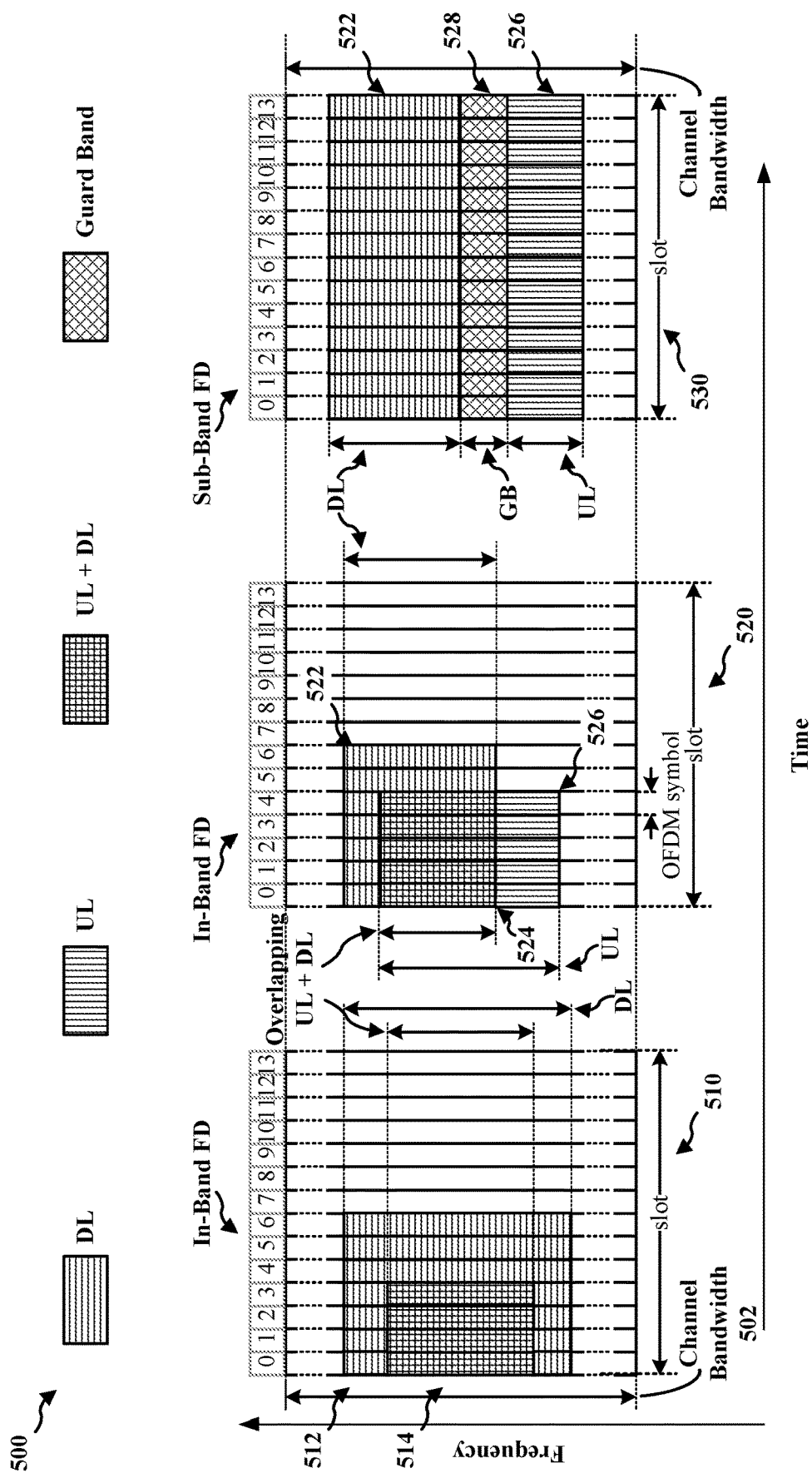
FIG. 5 is a diagram illustrating example resource allocations for in-band full duplex (IBFD) mode communication and sub-band full duplex (SBFD) mode communication.

FIG. 5 is a diagram 500 illustrating example resource allocations for IBFD mode communication and SBFD mode communication. Diagram 500 illustrates a set of slots in a particular channel having a particular channel bandwidth 502. A first example slot 510 for IBFD may include a set of DL time-and-frequency resources (e.g., resources) 512 and a set of fully-overlapping UL resources. A second example slot 520 for IBFD may include a set of DL resources 522 and a set of partially-overlapping UL resources 526 including a subset of overlapping UL resources 524. The overlapping DL and UL resources 514 and 524 indicate time-and-frequency resources that are used for both UL and DL (e.g., using different beam directionality or other self-interference canceling or mitigating methods). In some aspects, an example slot 530 for SBFD may include non-overlapping sets of UL resources 526, DL resources 522, and guard band resources 528.

In some aspects of wireless communication, e.g., 5 G NR, a base station and a UE may communicate via an unlicensed spectrum (e.g., an unlicensed frequency band) as discussed above. In some instances, in an unlicensed spectrum, a base station or UE may perform a LBT procedure to detect if another device (e.g., not the base station or UE) is using (e.g., transmitting over) the unlicensed spectrum. The LBT procedure may measure an energy in a set of RBs (or RB groups) that make up a LBT bandwidth to determine whether an energy in each of the sets of RBs is above (or below) a threshold. Based on the measured (or detected) energy, the base station or UE performing the LBT procedure determines whether (1) the channel is occupied and another LBT procedure is necessary or (2) the channel is unoccupied (available) and a transmission is allowed.

Figure 6:
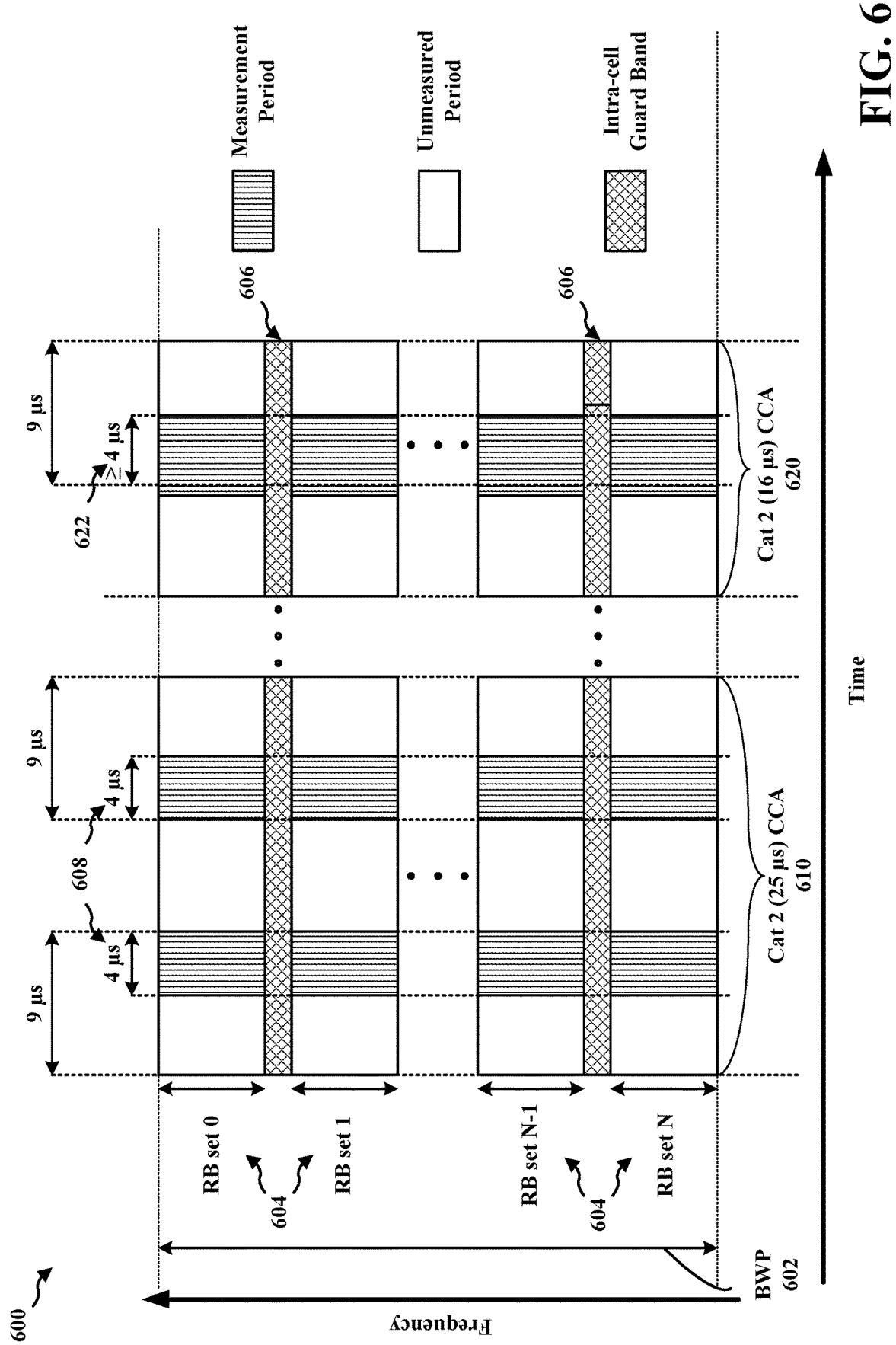
FIG. 6 is a diagram illustrating a set of monitored time-and-frequency resources for two different LBT procedures.

FIG. 6 is a diagram 600 illustrating a set of monitored time-and-frequency resources for two different LBT procedures. Diagram 600 illustrates a bandwidth part (BWP) 602 that includes multiple RB sets 604 (e.g., RB set 0 to RB set N) each separated by an intra-cell guard band 606. In some aspects, each RB set may be considered a separate channel for communication in an unlicensed frequency band (spectrum) and may span 20 MHz within the unlicensed frequency band (spectrum). The specific RB sets 604, in some aspects, may be determined based on a span (in frequency) of the BWP 602 and intra-cell guard band signaling (e.g., in release 16 via intraCellGuardBandDL-r16 or intraCellGuardBandUL-r16). The intra-cell guard band 606 may be different for an UL LBT procedure and a DL LBT procedure and may be specified as being of zero size (e.g., when a base station or UE performs all-or-nothing transmission).

Diagram 600 includes a first LBT procedure 610 that is a Cat 2 LBT with a 25 µs gap and a second LBT procedure 620 that is a Cat 2 LBT with a 16 µs gap. Each LBT procedure may include at least one measurement period (e.g., measurement period 608 or 622) during which energy in the RB sets 604 is measured to determine whether an energy in each of the set of RBs is above (or below) a threshold. Other LBT procedures may have different configurations of the RB sets 604, the intra-cell guard bands 606, and measurement periods 608 or 622. For example, RB sets may span a larger or smaller frequency range, there may be more or fewer RB sets, a larger or smaller (e.g., zero) intra-cell guard band, and/or different measurement periods (e.g., more/fewer, longer/shorter, or otherwise differently configured measurement periods).

In some aspects, a base station and UE may support FD mode communication as described above in relation to FIGS. 4 and 5. In the presence of an UL transmission, a base station may perform a LBT procedure and determine that the energy (e.g., from the UL transmission) in one or more RB sets is above a threshold and determine that the channels (e.g., the one or more RB sets) are occupied. However, for RB sets (channels) via which the base station and UE communicate in a FD mode (e.g., IBFD or SBFD), the presence of the UL transmission does not preclude the transmission of the DL transmission associated with the LBT procedure. In some aspects, the LBT procedure is unaware of the source of the measured energy and may lead to a base station backing off and not transmitting the DL transmission associated with the LBT procedure when the channel is available for the DL transmission (in FD mode). Accordingly, there may be a benefit to a method for canceling an UL transmission during a LBT procedure.

Figure 7:
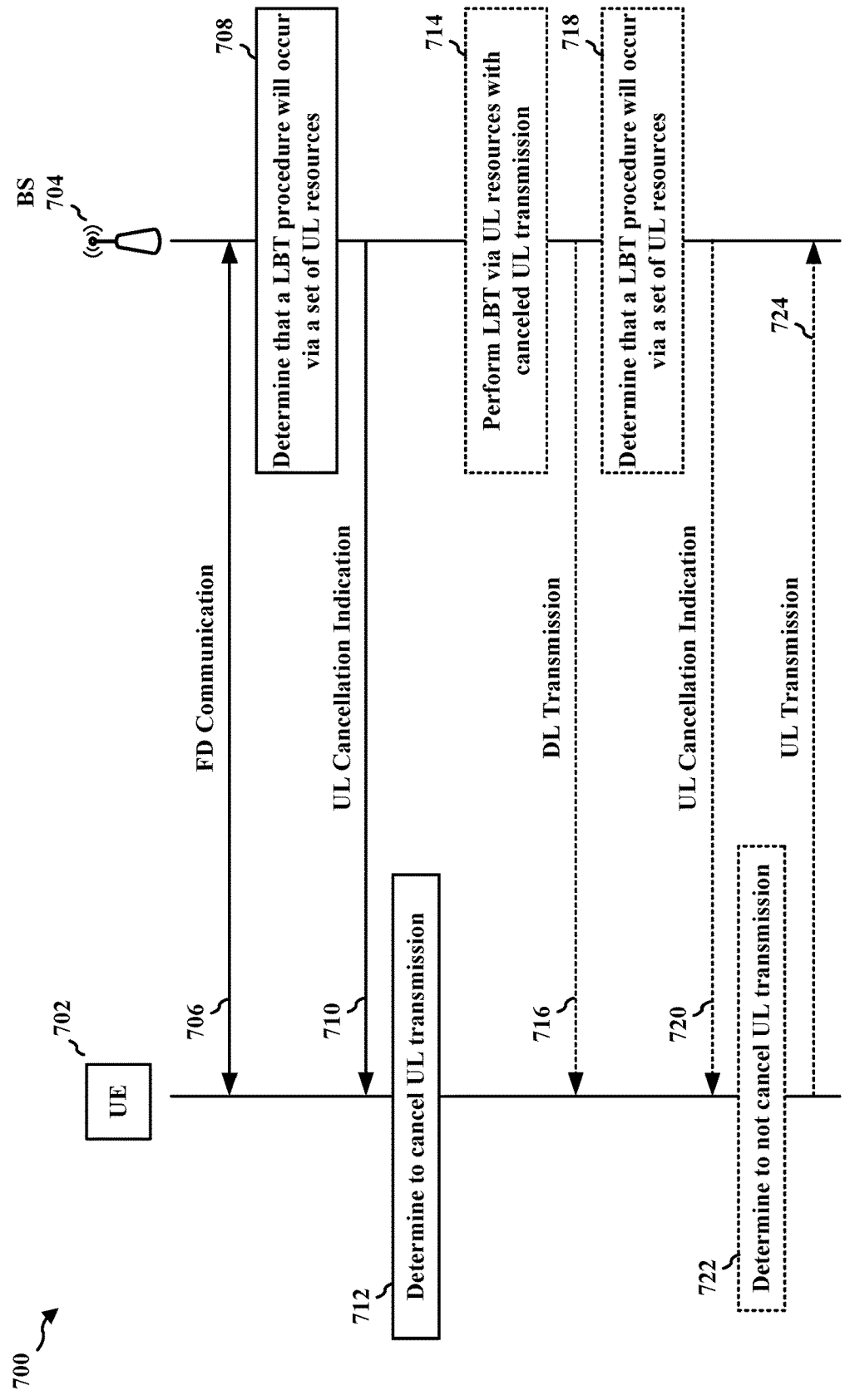
FIG. 7 is a call flow diagram illustrating a base station indicating to a UE a set of time-and-frequency resources associated with a LBT procedure.

FIG. 7 is a call flow diagram 700 illustrating a base station 704 indicating to a UE 702 a set of time-and-frequency resources associated with a LBT procedure. Optional steps are indicated with dotted lines. Diagram 700 illustrates that UE 702 may be communicating with base station 704 via FD communication 706. The base station 704 may determine 708 that a LBT procedure associated with DL scheduling will occur via a set of UL resources. The UL resources may include an UL configured grant during which the UE 702 may transmit UL data. The LBT procedure, in some aspects, may be for a control channel (e.g., a PDCCH) or other pre-scheduled DL transmission.

The base station 704 may then transmit an UL cancelation indication 710. The UL cancelation 710 may be an implicit UL cancelation indication, e.g., an indication of a prescheduled DL transmission via a PDCCH or DCI which may be preceded by a LBT procedure to ensure that the channel is available. In some aspects, the indication may be an explicit UL cancelation indication. For example, the UL cancelation indication 710 may specifically identify time-and-frequency resources to be canceled for the LBT procedure (e.g., using an existing cancelation indication), or a cancelation indication may indicate a time associated with the LBT procedure (e.g., a reference time or a start time), a frequency (or frequency range) associated with the LBT procedure, and a type (or category) of LBT procedure (e.g., Cat 1, Cat 2 (25 µs), Cat 2 (16 µs), or Cat 4) that together may be used to identify UL time-and-frequency resources for cancelation.

The UL cancelation indication 710 may be transmitted via DCI. The DCI may be a group-common DCI that is associated with one or more UEs in addition to the UE 702. The UL cancelation indication 710 may be transmitted via a licensed spectrum and/or an unlicensed spectrum.

The UE 702, based on the UL cancelation indication 710 (either implicit or explicit), may determine 712 to cancel at least one UL transmission corresponding to one or more UL resources, the one or more UL resources corresponding to the LBT procedure. In some aspects, the determination 712 to cancel the at least one UL transmission may include a determination that the at least one UL transmission is of a low priority. In some aspects, the priority may be assigned or determined in the context of UL transmission and may indicate that the low priority UL transmission should be canceled based on an UL cancelation indication. In some aspects, the determination 712 to cancel the at least one UL transmission may be based on a comparison between a priority of the at least one UL transmission and a priority of the DL transmission associated with the UL cancelation indication 710 (e.g., indicated in the UL cancelation indication).

The canceled UL transmission may be a partially-canceled UL transmission or a fully-canceled UL transmission. A partially-canceled UL transmission may include an UL transmission that begins before the LBT procedure and continues after the LBT procedure. The canceled UL transmission, in some aspects, is postponed and transmitted after the LBT procedure in a set of UL resources that may overlap a set of DL resources for a DL transmission associated with the LBT procedure. A fully-canceled UL transmission may include an UL transmission that overlaps in whole, or in part, the LBT procedure and is rescheduled to a subsequent set of time-and-frequency resources.

The base station 704, may then perform 714 the LBT procedure on/via the UL resources associated with the UL cancelation indication 710. As discussed in relation to FIG. 6, the LBT procedure may be one of multiple LBT procedures (e.g., Cat 1, Cat 2 (25/16 μs), or Cat 4). Performing 714 the LBT procedure, in some aspects, may include multiple LBT procedures (or multiple listening opportunities of a single LBT procedure). For example, a first measurement may detect an amount of energy in one or more channels (e.g., RB sets) that is more than a threshold amount of energy and may determine that the channel is occupied and perform at least one subsequent measurement until it determines that the channel is available.

Based on performing 714 the LBT procedure on/via the UL resources associated with the UL cancelation indication, the base station 704 may transmit, and the UE 702 may receive, a DL transmission 716. For example, based on determining that the channel is available, the base station 704 may transmit the DL transmission 716.

The base station 704 may determine 718 that an additional LBT procedure associated with an additional DL scheduling will occur via a set of UL resources. The UL resources may include an UL configured grant during which the UE 702 may transmit UL data. The LBT procedure, in some aspects, may be for a control channel (e.g., a PDCCH) or other pre-scheduled DL transmission.

The base station 704 may then transmit UL cancelation indication 720. The UL cancelation 720 may be an implicit UL cancelation indication, e.g., an indication of a prescheduled DL transmission via a PDCCH or DCI which may be preceded by a LBT procedure to ensure that the channel is available. In some aspects, the indication may be an explicit UL cancelation indication. For example, the additional UL cancelation indication 720 may specifically identify time-and-frequency resources to be canceled for the LBT procedure (e.g., using an existing cancelation indication), or the additional UL cancelation indication 720 may indicate a time associated with the LBT procedure, a frequency (or frequency range) associated with the LBT procedure, and a type (or category) of LBT procedure (e.g., Cat 1, Cat 2 (25 μs), Cat 2 (16 μs), or Cat 4) that together may be used to identify time-and-frequency resources for cancelation. The UL cancelation indication 720 may be transmitted via DCI. The DCI may be a group-common DCI that is associated with one or more UEs in addition to UE 702.

The UE 702, based on the UL cancelation indication 720 (either implicit or explicit), the UE may determine 722 to not cancel at least one additional UL transmission corresponding to one or more UL resources, the one or more UL resources corresponding to the LBT procedure. In some aspects, the determination 722 to cancel the at least one additional UL transmission may include a determination that the at least one UL transmission is of a high priority. In some aspects, the priority may be assigned or determined for the context of UL transmission and may indicate that the high priority UL transmission should not be canceled based on an UL cancelation indication. In some aspects, the determination 722 to not cancel the at least one additional UL transmission may be based on a comparison between a priority of the at least one additional UL transmission and a priority of the DL transmission associated with the UL cancelation indication 720 (e.g., indicated in the UL cancelation indication). Based on the determination 722 to not cancel the at least one additional UL transmission, the UE 702 may transmit, and the base station 704 may receive, the at least one additional UL transmission.

Figure 8:
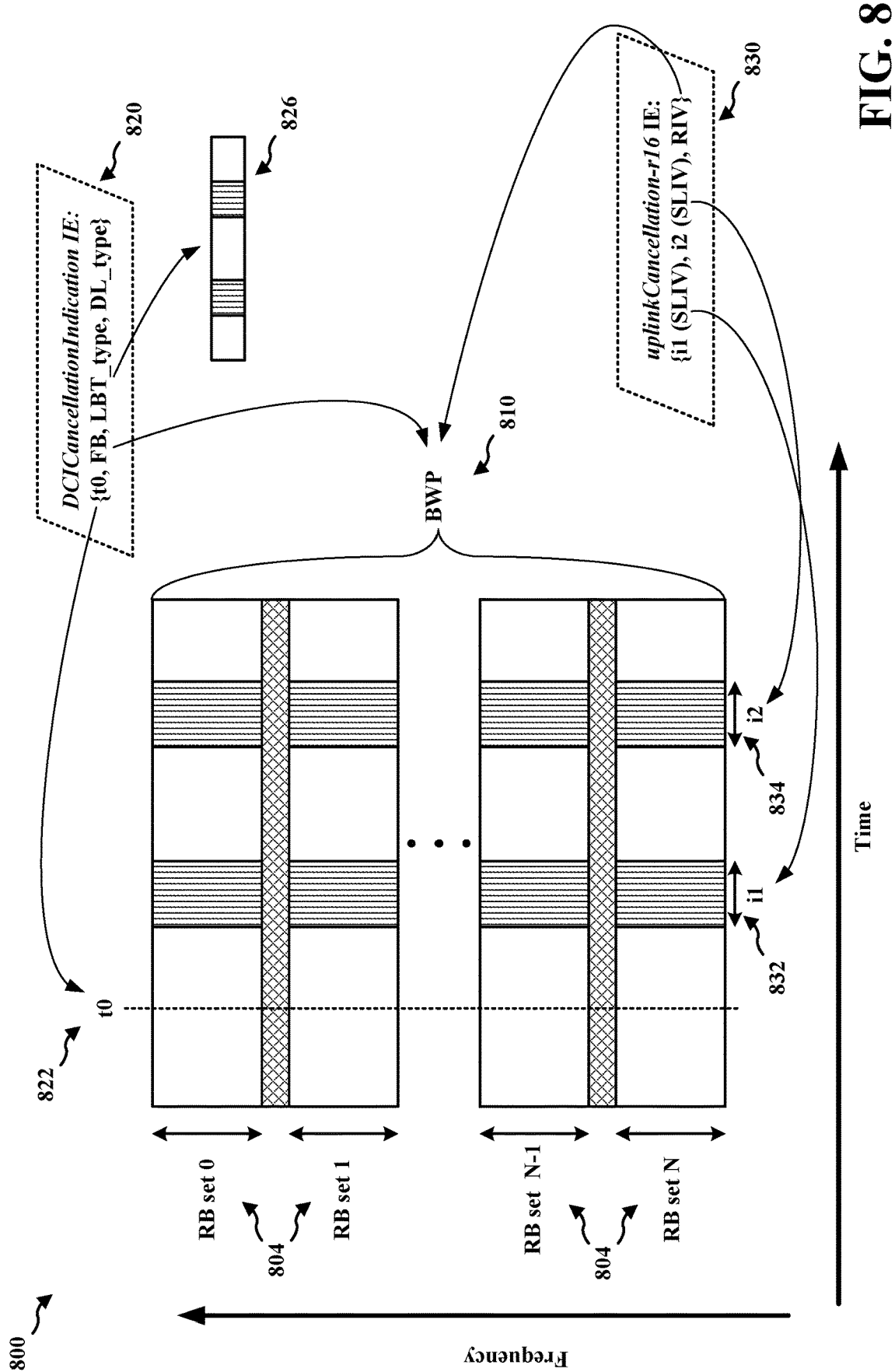
FIG. 8 is a diagram illustrating a LBT procedure and associated signaling information elements (IEs).

FIG. 8 is a diagram 800 illustrating a LBT procedure and associated signaling IEs 820 and 830. Optional components are indicated with dotted lines. Diagram 800 illustrates a DCICancelationIndication IE 820 (as an example of an IE or other data structure that may be used to communicate a cancelation indication). DCICancelationIndication IE 820 may include an indication of a reference time "t0" 822, an indication of a frequency band (e.g., BWP 810), an indication of a LBT type (e.g., LBT_type 826), and/or a DL transmission type (e.g., DL_type) associated with a specific priority. Based on the indications included in the DCICancelationIndication IE 820, a UE (e.g., UE 702 of FIG. 7) may determine the time-and-frequency resources associated with a LBT procedure. For example, the reference time, to, may indicate a start time for a LBT procedure and the measurement periods may be identified based on the indication of the LBT type. Additionally, the RB sets 804 may be identified by the frequency band indication.

In some aspects, the uplinkCancellation-r16 IE 830 may include a set of indications of measurement intervals (e.g., "i1" 832 and "i2" 834) and an indication of a frequency band (or range) that will be measured by a LBT procedure. For example, each time interval may be specified by a start and length indicator value (SLIV) and the frequency band (e.g., BWP 810) may be identified by a resource indicator value (MV). For example, referring to FIG. 7, a UE 702 may receive an UL cancelation indication 710 or 720 and identify a set of time-and-frequency resources via which the LBT procedure will be performed.

Figure 9:
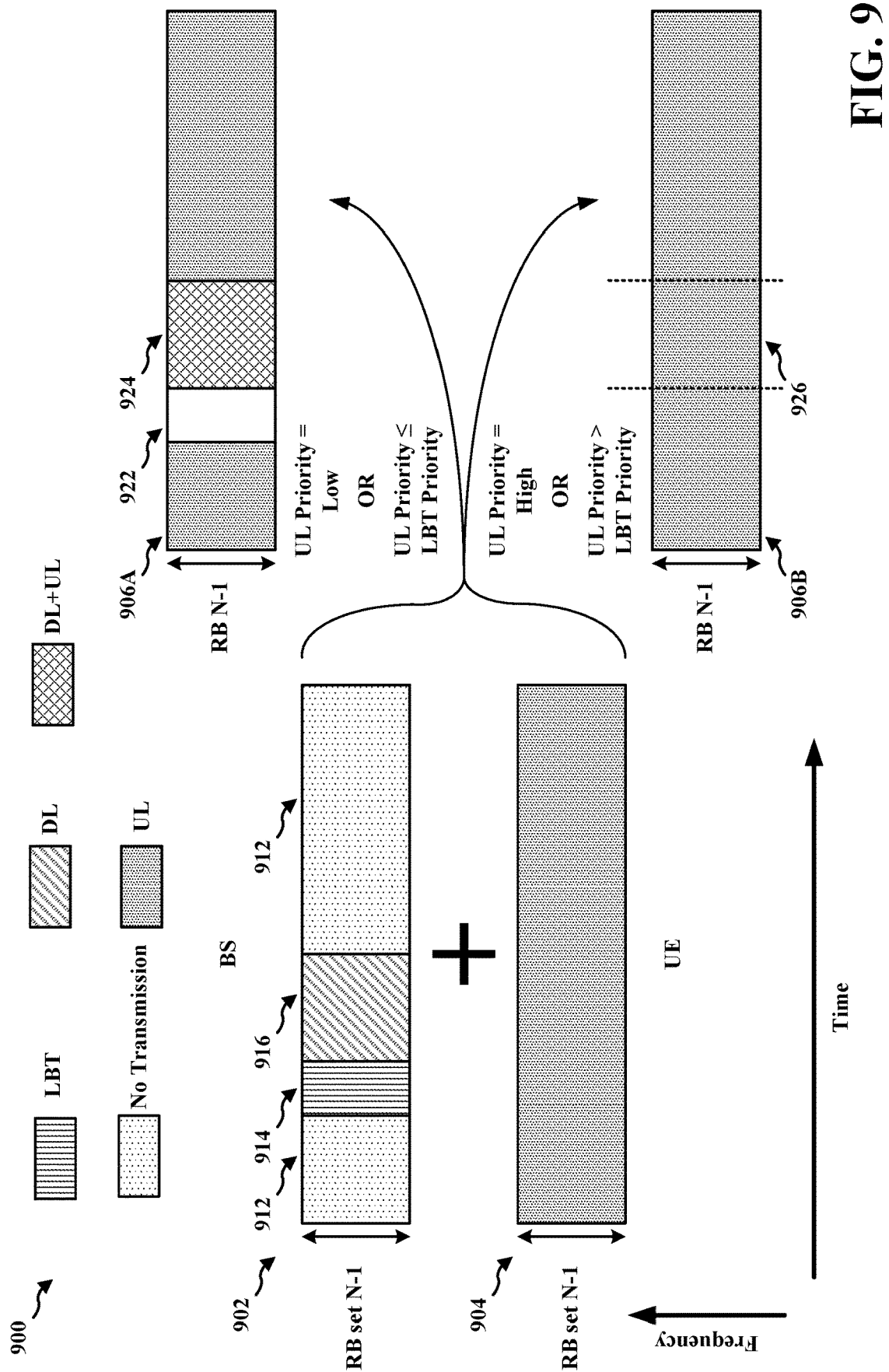
FIG. 9 is a diagram illustrating possible responses of a UE to a cancelation indication during a set of time-and-frequency resources via which DL data and UL data may be transmitted in a FD mode (e.g., IBFD or SBFD).

FIG. 9 is a diagram 900 illustrating possible responses of a UE to a cancelation indication during a set of time-and-frequency resources (e.g., 902/904) in a particular RB set (e.g., RB set N-1) via which DL data and UL data may be transmitted in a FD mode (e.g., IBFD or SBFD). Time-and-frequency resources 902 illustrate sets of time-and-frequency resources 912 during which no transmission is scheduled (in some aspects, other DL transmissions are scheduled during the sets of time resources 912), a set of time resources 914 during which a LBT procedure is performed, and a set of resources 916 during which a DL transmission associated with the LBT procedure is scheduled (assuming LBT identifies the channel as available). Time-and-frequency resources 904 illustrate a set of UL time-and-frequency resources during which an UL transmission is scheduled, however, in some aspects, there may be some of the UL time-and-frequency resources that are not scheduled for UL transmissions.

A cancelation indication to cancel an UL transmission during time-and-frequency resources associated with the LBT procedure may be received by a UE. Time-and-frequency resources 906A illustrate that, based on the UL cancelation indication, a UE may determine to cancel at least one UL transmission corresponding to one or more UL resources in the set of UL resources 904, the one or more UL resources corresponding to the LBT procedure via time-and-frequency resources 914. Based on the UL cancelation, the base station may determine that the channel is available and may transmit DL data via time-and-frequency resources 924 while the UE transmits UL data. The determination to cancel the UL transmission during the time-and-frequency resources 914 may be based on a determination of a priority (e.g., a low priority) of the UL transmission. In some aspects, the determination to cancel the UL transmission may additionally be based on a determination of a priority of the DL transmission and a comparison of the priorities of the UL and DL transmission. For example, referring to FIG. 7, the UE 702 may receive UL cancelation indication 710 and determine 712 to cancel an UL transmission associated with the DL transmission 716.

Alternatively, time-and-frequency resources 906B illustrating that, based on the UL cancelation indication, a UE may determine to not cancel at least one UL transmission corresponding to one or more UL resources in the set of UL resources 904, the one or more UL resources corresponding to the LBT procedure via time-and-frequency resources 914. The determination to not cancel the UL transmission during the time-and-frequency resources 914 may be based on a determination of a priority (e.g., a high priority) of the UL transmission. In some aspects, the determination to cancel the UL transmission may additionally be based on a determination of a priority of the DL transmission and a comparison of the priorities of the UL and DL transmission. Accordingly, the base station may determine that the channel is occupied and the DL transmission scheduled for time-and-frequency resources 916 may not be transmitted. The time-and-frequency resources 926 may then include solely UL transmissions. For example, referring to FIG. 7, the UE 702 may receive UL cancelation indication 720 and determine 722 to not cancel an UL transmission associated and transmit UL transmission 724.

Figure 10:
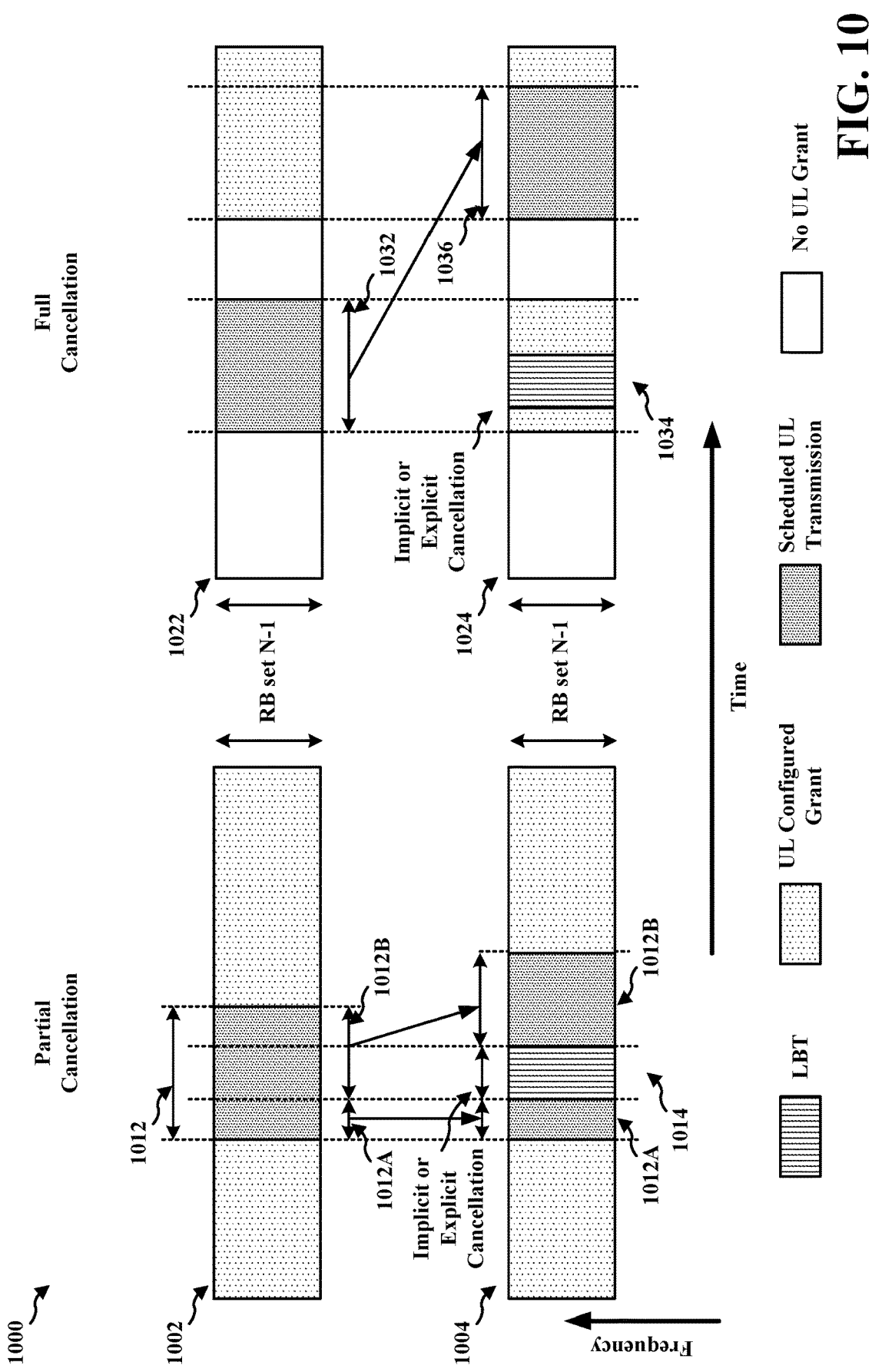
FIG. 10 is a diagram illustrating a partial cancelation and a full cancelation of an UL transmission.

FIG. 10 is a diagram 1000 illustrating a partial cancelation and a full cancelation of an UL transmission. Diagram 1000 incudes sets of time-and-frequency resources 1002 and 1022 in a particular RB set (e.g., RB set N-1). A UE with an UL transmission scheduled during the set of time-and-frequency resources 1012 and 1032, may receive an UL cancelation indication (either implicit or explicit) to cancel an UL transmission via time-and-frequency resources 1014/1034. A UE may perform a partial cancelation as illustrated in the set of time-and-frequency resources 1004. A partial cancelation may be performed, in some aspects, when a LBT procedure begins after the set of time-and-frequency resources 1012 (e.g., after a sufficient period for decoding). Accordingly, an UL transmission 1012A may begin as scheduled and may be continued as UL transmission 1012B after the LBT procedure.

A UE may perform a full cancelation as illustrated in the set of time-and-frequency resources 1024. A full cancelation may be performed, in some aspects, when a LBT procedure overlaps a beginning of the set of time-and-frequency resources 1032 or after the beginning of the set of time-and-frequency resources 1032 (e.g., but after less than a sufficient period for decoding). If an UL configured grant does not include enough time-and-frequency resources to transmit the UL transmission without transmitting during the LBT procedure, the scheduled UL transmission 1032 may be fully canceled and rescheduled during a subsequent set of time-and-frequency resources 1036 (e.g., during a subsequent UL configured grant). For example, fully canceling an UL transmission may include canceling related UL transmissions (e.g., portions of a n UL transmission) that are scheduled before and/or after the UL resources (e.g., resources 1014/1034) identified by an UL cancelation indication (e.g., 710/720 and/or 820/830).

Figure 11:
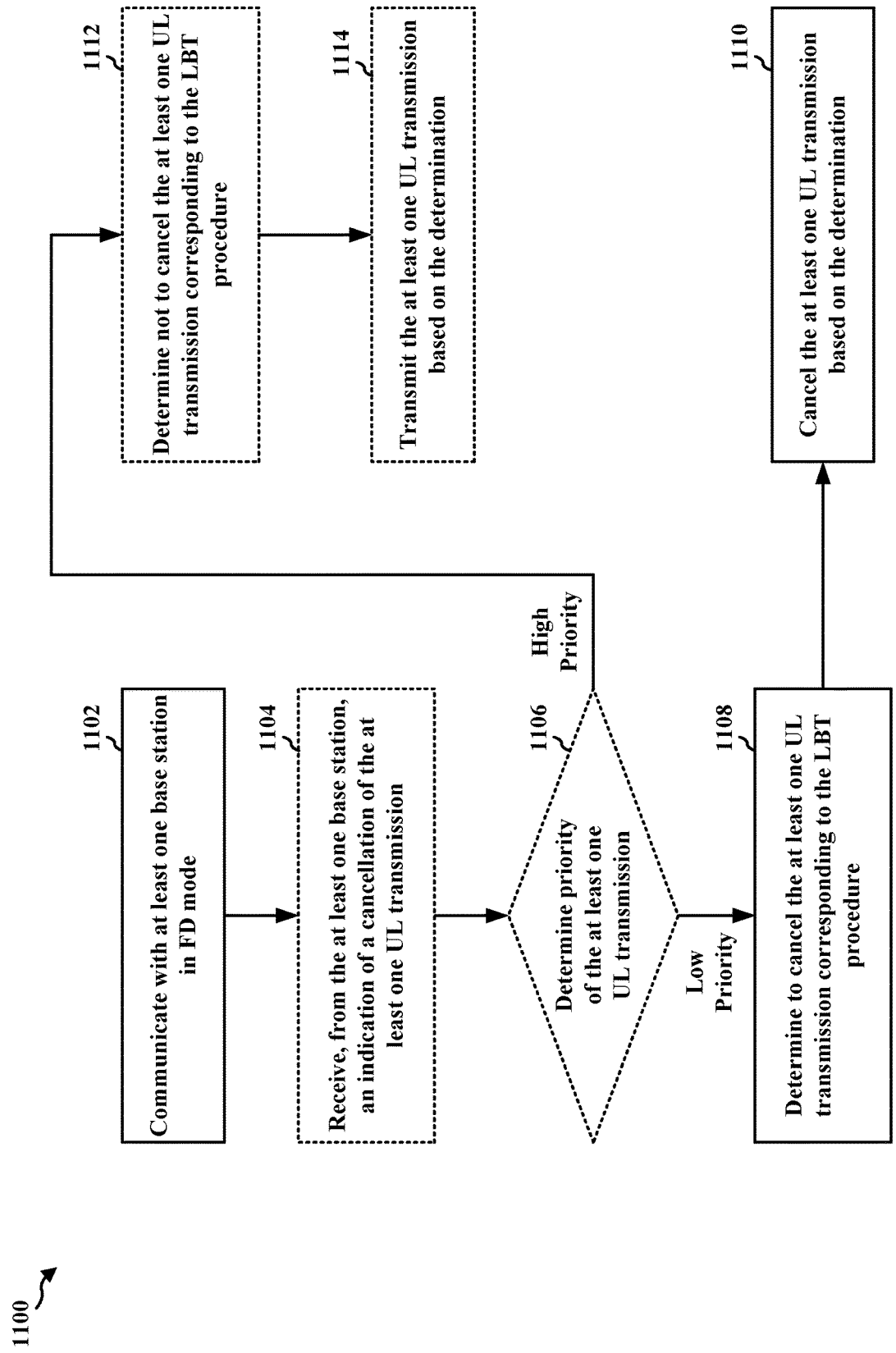
FIG. 11 is a flowchart of a method of wireless communication.

FIG. 11 is a flowchart 1100 of a method of wireless communication. The method may be performed by a UE (e.g., the UE 104; UE 702; the apparatus 1302). Optional steps are indicated with dotted lines. At 1102, the UE may communicate, in a FD mode (e.g., IBFD or SBFD), with at least one base station. The FD mode communication, in some aspects, may be via one or more of a licensed spectrum (frequency band) or an unlicensed spectrum (e.g., a 5 GHz or 6 GHz unlicensed spectrum/frequency band). The communication may be via multiple channels within a BWP, with each channel spanning 20 MHz and separated by configured intra-cell guard bands (e.g., a DL intra-cell guard band and an UL intra-cell guard band). For example, referring to FIG. 7, UE 702 and base station 704 may communicate via FD communication 706. For example, 1102 may be performed by FD communication component 1340 of FIG. 13.

At 1104, the UE may receive, from the at least one base station, an indication of a cancelation of the at least one UL transmission corresponding to one or more UL resources that in turn correspond to a LBT procedure. The at least one UL transmission may be canceled, at 1110, or not canceled, at 1114, based on the received indication as discussed below. In some aspects, the indication includes information associated with at least one of (1) information regarding at least one of (i) one or more time resources, (ii) one or more frequency resources, and/or (iii) a LBT configuration associated with the LBT procedure, or (2) an indication of a set of time-and-frequency resources associated with the LBT procedure. For example, referring to FIGS. 7 and 8, the UE 702 may receive UL cancelation indication 710/720, where the UL cancelation 710/720 includes one of DCICancelationIndication IE 820 or uplinkCancellation-r16 IE 830. For example, 1104 may be performed by UL cancelation indication reception component 1342 of FIG. 13.

In some aspects, after receiving the UL cancelation indication at 1104, the UE may determine, at 1106, a priority of the at least one UL transmission. The priority of an UL transmission, in some aspects, may be an UL-cancelation-specific priority (e.g., either high or low priority) that indicates whether an UL transmission will be canceled based on an UL cancelation indication. In some aspects, a range of UL-cancelation-specific priorities may be available to allow for a hierarchy of UL and DL transmissions priorities that may be used to determine whether to cancel a particular UL transmission based on a LBT procedure associated with a particular DL transmission. In some aspects, an explicit UL cancelation indication may not be received at 1104, and the UE, based on a previously scheduled DL transmission (e.g., a control channel transmission such as a PDCCH associated with particular resources), may be configured to interpret each previously scheduled DL transmission occasion to implicitly provide an UL cancelation indication associated with a LBT procedure and perform the determination as to the priority of the at least one UL transmission at 1106. For example, 1106 may be performed by UL priority determination and cancelation component 1344 of FIG. 13.

If the UE determines, at 1106, that the at least one UL transmission has low priority, the UE may determine, at 1108, to cancel the at least one UL transmission corresponding to the one or more UL resources. In some aspects, the UE may determine, at 1106, that the at least one UL transmission (e.g., PUSCH) has a lower priority than a DL transmission (e.g., a PDCCH) associated with the received UL cancelation indication. The at least one UL transmission may correspond to the one or more UL resources which may correspond to the LBT procedure. For example, referring to FIG. 7, the UE 702 may receive UL cancelation indication 710 and may determine 712 (based on a priority determination such as at 1106) to cancel the at least one UL transmission associated with the cancelation indication 710 (e.g., the UL resources or LBT procedure). For example, 1108 may be performed by UL priority determination and cancelation component 1344 of FIG. 13.

Based on the determination, at 1108, to cancel the at least one UL transmission, the UE may cancel, at 1110, the at least one UL transmission corresponding to the one or more UL resources. As discussed above in relation to FIG. 10, the cancelation may include at least partially canceling the at least one UL transmission that was scheduled for transmission during the one or more UL resources or may include fully canceling the at least one UL transmission. For example, 1110 may be performed by UL priority determination and cancelation component 1344 of FIG. 13.

For example, referring to FIGS. 7-10, the UE 702 may receive UL cancelation indication 710 including one of DCICancelationIndication IE 820 or uplinkCancellation-r16 IE 830. Based on the indicated UL time-and-frequency resources indicated in the UL cancelation indication 710 (and a DL priority associated with the UL cancelation indication 710) the UE may determine 712 to cancel at least one UL transmission based on the priority of the UL (and DL) transmission(s). For example, the determination 712 to cancel the at least one UL transmission may be based on a determination that a priority of the UL transmission is low (or is lower than the priority of the DL transmission). After determining 712 to cancel the at least one UL transmission, the UE may cancel the UL transmission (e.g., canceling an UL transmission via resources 922). The cancelation may be partial (e.g., canceling UL transmission via the set of time-and-frequency resources 1014) as for the UL transmission scheduled during the set of time-and-frequency resources 1012. In some aspects, the cancelation may be full as for the UL transmission scheduled during the set of time-and-frequency resources 1032.

If the UE determines, at 1106, that the at least one UL transmission has high priority, the UE may determine, at 1112, not to cancel the at least one UL transmission corresponding to the one or more UL resources. In some aspects, the UE may determine, at 1106, that the at least one UL transmission (e.g., PUCCH) has a higher priority than a DL transmission (e.g., PDSCH) associated with the received UL cancelation indication. The at least one UL transmission may correspond to the one or more UL resources which may correspond to the LBT procedure. For example, referring to FIG. 7, the UE 702 may receive UL cancelation indication 720 and may determine 722 (based on a priority determination such as at 1106) not to cancel the at least one UL transmission associated with the cancelation indication 720 (e.g., the UL resources or LBT procedure). For example, 1112 may be performed by UL priority determination and cancelation component 1344 of FIG. 13.

Based on the determination, at 1112, not to cancel the at least one UL transmission, the UE may transmit, at 1114, the at least one UL transmission corresponding to the one or more UL resources. For example, referring to FIGS. 7-10, the UE 702 may receive UL cancelation indication 720 including one of DCICancelationIndication IE 820 or uplinkCancellation-r16 IE 830. Based on the indicated UL time-and-frequency resources indicated in the UL cancelation indication 720 (and a DL priority associated with the UL cancelation indication 720) the UE may determine 722 not to cancel the at least one UL transmission based on the priority of the UL (and DL) transmission(s). For example, the determination 722 not to cancel the at least one UL transmission may be based on a determination that a priority of the UL transmission is high (or is higher than the priority of the DL transmission). After determining 722 not to cancel the at least one UL transmission, the UE may transmit the UL transmission 724. For example, 1114 may be performed by UL priority determination and cancelation component 1344 of FIG. 13.

Figure 12:
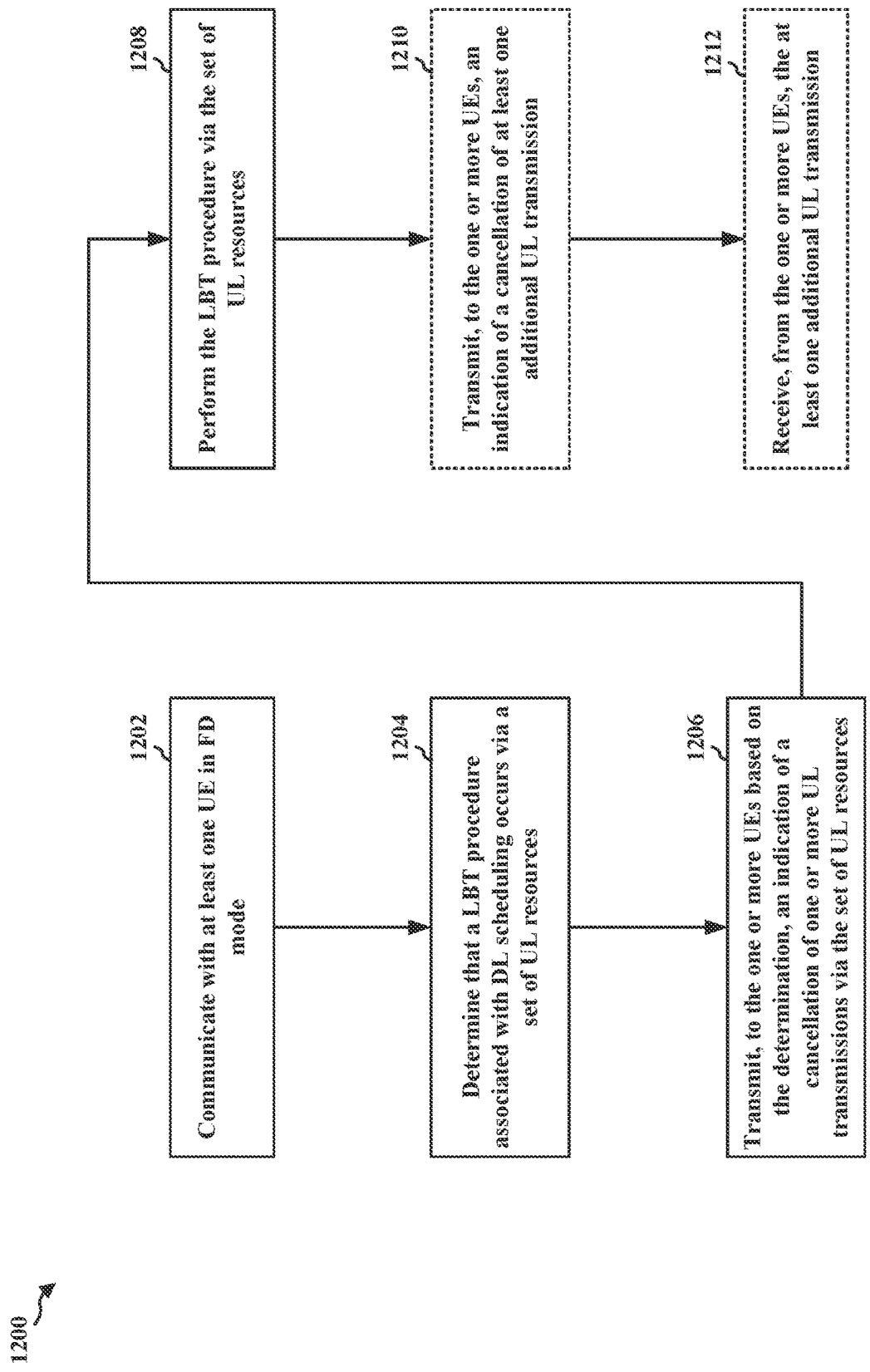
FIG. 12 is a flowchart of a method of wireless communication.

FIG. 12 is a flowchart 1200 of a method of wireless communication. The method may be performed by a base station (e.g., the base station 102/180; base station 704; the apparatus 1402). Optional steps are indicated with dotted lines. At 1202, the base station may communicate in a FD mode, with one or more UEs. The FD mode communication, in some aspects, may be via one or more of a licensed spectrum (frequency band) or an unlicensed spectrum (e.g., a 5 GHz or 6 GHz unlicensed spectrum/frequency band). The communication may be via multiple channels within a BWP, with each channel spanning 20 MHz and separated by configured intra-cell guard bands (e.g., a DL intra-cell guard band and an UL intra-cell guard band). For example, referring to FIG. 7, UE 702 and base station 704 may communicate via FD communication 706. For example, 1202 may be performed by FD communication component 1440 of FIG. 14.

At 1204, the base station may determine that a LBT procedure associated with DL scheduling will occur via a set of UL resources. The UL resources may include an UL configured grant during which a UE may transmit UL data. The LBT procedure, in some aspects, may be for a control channel (e.g., a PDCCH) or other pre-scheduled DL transmission. For example, referring to FIGS. 7-10, the base station 704 may determine that a LBT procedure associated with a scheduled DL transmission will occur via a set of UL resources (e.g., resources 914, 1014, and 1034). For example, 1204 may be performed by UL cancelation determination component 1442 of FIG. 14.

After determining that the LBT procedure associated with DL scheduling will occur via the set of UL resources, the base station, at 1206, may transmit an indication of a cancelation of one or more UL transmissions during the set of UL resources to one or more UEs based on the determination at 1204. In some aspects, the indication may be an explicit UL cancelation indication. For example, an UL cancelation indication may specifically identify time-and-frequency resources to be canceled for the LBT procedure. In some aspects, an UL cancelation indication may indicate a time associated with the LBT procedure, a frequency (or frequency range) associated with the LBT procedure, a type (or category) of LBT procedure (e.g., Cat 1, Cat 2 (25 μs), Cat 2 (16 μs), or Cat 4), and/or a priority associated with the associated DL transmission. The indications included in the UL cancelation indication may be used to identify time-and-frequency resources for cancelation and whether an UL transmission scheduled via the UL resources will be canceled based on the relative priorities of the DL and UL transmissions associated with the LBT procedure. The UL cancelation indication may be transmitted via DCI. The DCI may be a group-common DCI that is associated with one or more UEs. The UL cancelation indication may be transmitted via a licensed spectrum and/or an unlicensed spectrum.

For example, referring to FIGS. 7 and 8, the base station 704 may transmit UL cancelation indication 710 to the UE 702. The UL cancelation indication 710 may include the DCICancelationIndication IE 820 or the uplinkCancellation-r16 IE 830. As illustrated in FIG. 8, the UL cancelation indication 710 may indicate (e.g., via IE 820 or 830) the time-and-frequency resources 832 and 834. For example, 1206 may be performed by UL cancelation indication transmission component 1444 of FIG. 14.

At 1208, the base station may perform the LBT procedure via the set of UL resources. As discussed in relation to FIG. 6, the LBT procedure may be one of multiple types of LBT procedures (e.g., Cat 1, Cat 2 (25 μs), Cat 2 (16 μs), or Cat 4). The LBT procedure performed at 1208 may measure an energy in a set of RBs (or RB groups) (e.g., RB sets 604 and 804 of FIGS. 6 and 8) that make up a LBT bandwidth to determine whether an energy in each of the sets of RBs is above (or below) a threshold. Based on the measured (or detected) energy, the base station or UE performing the LBT procedure determines whether (1) the channel is occupied and another LBT procedure is necessary or (2) the channel is unoccupied (available) and a transmission is allowed.

For example, referring to FIGS. 6-10, the base station 704 may perform the LBT procedure 714. The LBT procedure 714 may be performed via time-and-frequency resources 604/608/610/620/622, 804/832/834, 914, and 1014/1034. The LBT procedure, in some aspects, may include one or more measuring periods in which an energy is measured to be above a threshold and a final measuring period in which an energy is measured to be below a threshold. For example, 1208 may be performed by LBT procedure component 1446 of FIG. 14.

At 1210, the base station may transmit, to the one or more UEs, an indication of a cancelation of at least one additional UL transmission. The at least one additional UL transmission may correspond to one or more additional UL resources and the one or more additional UL resources may correspond to one of a subsequent LBT procedure or a prior LBT procedure. The at least one additional UL cancelation indication may be based on an additional determination that a LBT procedure will occur via the one or more additional UL resources. For example, referring to FIG. 7, the base station 704 may determine 718 that a LBT procedure will occur via a set of additional UL resources and transmit UL cancelation indication 720. For example, 1210 may be performed by UL cancelation indication transmission component 1444 of FIG. 14.

After transmitting the UL cancelation indication at 1210, the base station may receive from the one or more UEs the at least one additional UL transmission via the one or more additional UL resources. For example, referring to FIGS. 7, 9, and 11, the base station may receive UL transmission 724 from the UE 702. The UL transmission may not be canceled by the UE 702 based on the UE 702 determining (e.g., at 1106) that the UL transmission has a high priority and/or has a higher priority than a DL transmission associated with the UL cancelation indication 720. For example, 1212 may be performed by LBT procedure component 1446 of FIG. 14.

Figure 13:
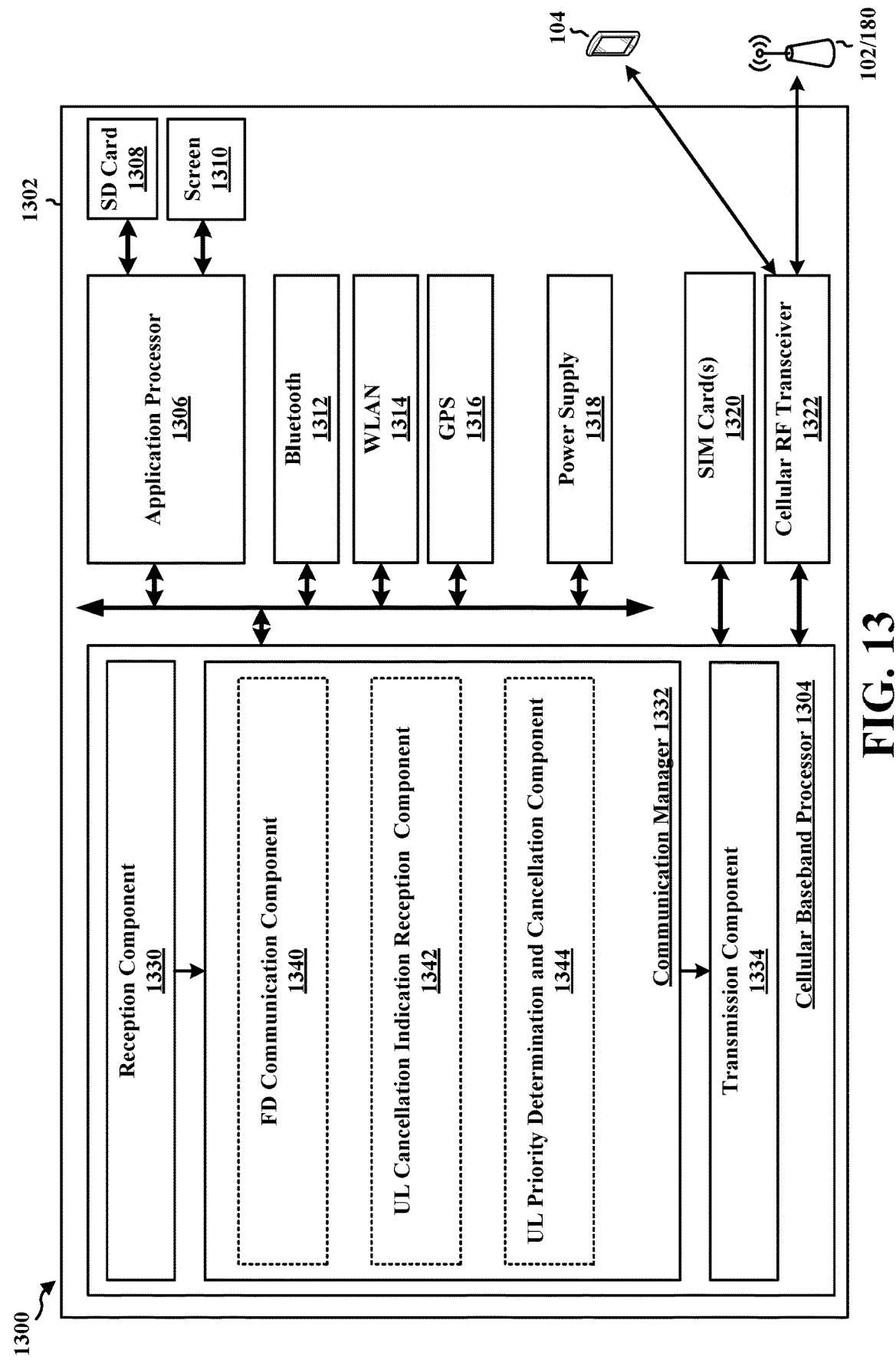
FIG. 13 is a diagram illustrating an example of a hardware implementation for an example apparatus.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the aforediscussed additional modules of the apparatus 1302.

The communication manager 1332 includes a FD communication component 1340 that is configured to communicate, in a FD mode, with at least one base station, e.g., as described in connection with 1102 of FIG. 11. The communication manager 1332 further includes an UL cancelation indication reception component 1342 that may be configured to receive, from the at least one base station, an indication of a cancelation of the at least one UL transmission, where the at least one UL transmission is canceled based on the received indication, e.g., as described in connection with 1104 of FIG. 11. The communication manager 1332 further includes an UL priority determination and cancelation component 1344 that receives input in the form of an UL cancelation indication from the UL cancelation indication reception component 1342 and is configured to determine whether to cancel at least one UL transmission corresponding to one or more UL resources, the one or more UL resources corresponding to a LBT procedure and transmitting a UL transmission that has not been canceled, e.g., as described in connection with 1106 to 1114 of FIG. 11.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for communicating, in a FD mode, with at least one base station. The apparatus 1302, and in particular the cellular baseband processor 1304, may include means for receiving, from the at least one base station, an indication of a cancelation of the at least one UL transmission, where the at least one UL transmission is canceled based on the received indication. The apparatus 1302, and in particular the cellular baseband processor 1304, includes means for determining to cancel at least one UL transmission corresponding to one or more UL resources, the one or more UL resources corresponding to a LBT procedure. The apparatus 1302, and in particular the cellular baseband processor 1304, includes means for canceling, based on the determination, the at least one UL transmission corresponding to the one or more UL resources. The apparatus 1302, and in particular the cellular baseband processor 1304, may include means for receiving, from the at least one base station, an indication of a cancelation of at least one additional UL transmission, the at least one additional UL transmission corresponding to one or more additional UL resources, the one or more additional UL resources corresponding to one of a subsequent LBT procedure or a prior LBT procedure. The apparatus 1302, and in particular the cellular baseband processor 1304, may include means for determining, based on a priority of the at least one additional UL transmission, not to cancel the at least one additional UL transmission. The apparatus 1302, and in particular the cellular baseband processor 1304, may include means for transmitting, based on the determination, the at least one additional UL transmission corresponding to the one or more additional UL resources. The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
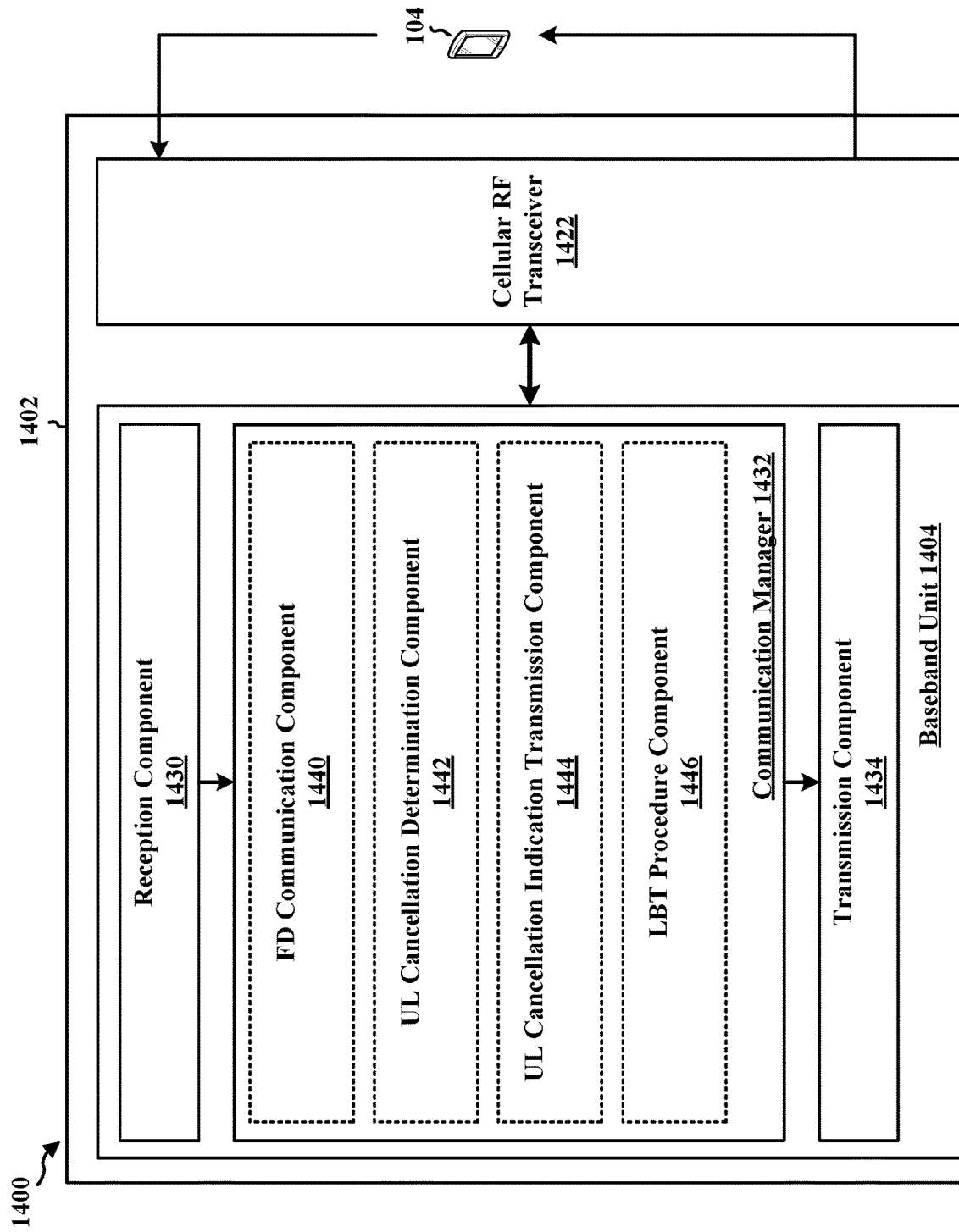
FIG. 14 is a diagram illustrating an example of a hardware implementation for an example apparatus.

FIG. 14 is a diagram 1400 illustrating an example of a hardware implementation for an apparatus 1402. The apparatus 1402 is a BS and includes a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the BS 310 and may include the memory 376 and/or at least one of the TX processor 316, the RX processor 370, and the controller/processor 375.

The communication manager 1432 includes a FD communication component 1440 that is configured to communicate, in a FD mode, with one or more UEs, e.g., as described in connection with 1202 of FIG. 12. The communication manager 1432 further includes an UL cancelation determination component 1442 that is configured to determine that a LBT procedure associated with DL scheduling will occur via a set of UL resources, e.g., as described in connection with 1204 of FIG. 12. The communication manager 1432 further includes an UL cancelation indication transmission component 1444 that may be configured to receive, from UL cancelation determination component 1442, the UL resources corresponding to the LBT procedure and to transmit, to the one or more UEs based on the determination, an indication of a cancelation of one or more UL transmissions during the set of UL resources, e.g., as described in connection with 1206 of FIG. 12. The communication manager 1432 further includes a LBT procedure component 1446 that may be configured to perform the LBT procedure via the set of UL resources, e.g., as described in connection with 1208 of FIG. 12. The UL cancelation determination component 1442 may further be configured to determine that an additional LBT procedure associated with DL scheduling will occur via a set of additional UL resources, e.g., as described in connection with 1210 of FIG. 12. The UL cancelation indication transmission component 1444 may further be configured to receive, from UL cancelation determination component 1442, the additional UL resources corresponding to the additional LBT procedure and to transmit, to the one or more UEs based on the determination, an indication of a cancelation of one or more additional UL transmissions during the set of additional UL resources, e.g., as described in connection with 1210 of FIG. 12. The LBT procedure component 1446 may further be configured to perform the LBT procedure via the set of additional UL resources and receive (or measure) an UL transmission from the one or more UEs the at least one additional UL transmission, e.g., as described in connection with 1208 of FIG. 12.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for communicating, in a FD mode, with one or more UEs. The apparatus 1402, and in particular the cellular baseband processor 1404, includes means for determining that a LBT procedure associated with DL scheduling will occur via a set of UL resources. The apparatus 1402, and in particular the cellular baseband processor 1404, includes means for transmitting, to the one or more UEs based on the determination, an indication of a cancelation of one or more UL transmissions during the set of UL resources. The apparatus 1402, and in particular the cellular baseband processor 1404, may include means for performing the LBT procedure via the set of UL resources. The apparatus 1402, and in particular the cellular baseband processor 1404, may include transmitting, to the one or more UEs, an indication of a cancelation of at least one additional UL transmission, the at least one additional UL transmission corresponding to one or more additional UL resources, the one or more additional UL resources corresponding to one of a subsequent LBT procedure or a prior LBT procedure. The apparatus 1402, and in particular the cellular baseband processor 1404, may include receiving, from the one or more UEs, the at least one additional UL transmission corresponding to the one or more additional UL resources. The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

In some aspects of wireless communication, e.g., 5 G NR, a base station and a UE may communicate via an unlicensed spectrum (e.g., unlicensed frequency band) as discussed above. However, in an unlicensed spectrum, a base station or UE may perform a LBT procedure to detect if another device (e.g., not the base station or UE) is using (e.g., transmitting over) the unlicensed spectrum. The LBT procedure may measure an energy in a set of RBs (or RB groups) that make up a LBT bandwidth to determine whether an energy in each of the sets of RBs (e.g., channels) is above (or below) a threshold. Based on the measured (or detected) energy, the base station or UE performing the LBT procedure determines whether (1) the channel is occupied and another LBT procedure is necessary or (2) the channel is unoccupied (available) and a transmission is allowed.

In the presence of an UL transmission, a base station may perform a LBT procedure and determine that the energy (e.g., from the UL transmission) in one or more RB sets is above a threshold and determine that the channels (e.g., the one or more RB sets) are occupied. However, for RB sets (channels) via which the base station and UE communicate in a FD mode (e.g., IBFD or SBFD), the presence of the UL transmission does not preclude the transmission of the DL transmission associated with the LBT procedure. In some aspects, the LBT procedure is unaware of the source of the measured energy and may lead to a base station backing off and not transmitting the DL transmission associated with the LBT procedure when the channel is available for the DL transmission (in FD mode). Accordingly, there may be a benefit to canceling an UL transmission during a LBT procedure associated with a DL transmission in a FD mode.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, including communicating, in a FD mode, with at least one base station; determining to cancel at least one UL transmission corresponding to one or more UL resources, the one or more UL resources corresponding to a LBT procedure; and canceling, based on the determination, the at least one UL transmission corresponding to the one or more UL resources.

Aspect 2 is the method of aspect 1, where the FD mode communication with the at least one base station includes communication via an unlicensed frequency band.

Aspect 3 is the method of any of aspects 1 and 2, where the LBT procedure is a LBT procedure performed by the at least one base station.

Aspect 4 is the method of any of aspects 1 to 3, further including receiving, from the at least one base station, an indication of a cancelation of the at least one UL transmission, where the at least one UL transmission is canceled based on the received indication.

Aspect 5 is the method of aspect 4, where the received indication includes information associated with at least one of (1) information regarding at least one of one or more time resources, one or more frequency resources, or a LBT configuration associated with the LBT procedure, or (2) an indication of a set of time-and-frequency resources associated with the LBT procedure Aspect 6 is the method of any of aspects 4 and 5, where the indication is received via group common DCI.

Aspect 7 is the method of any of aspects 1 to 6, where canceling the at least one UL transmission is based on a previously scheduled DL transmission associated with the LBT procedure.

Aspect 8 is the method of aspect 7, where the previously scheduled DL transmission is a control channel transmission Aspect 9 is the method of any of aspects 1 to 8, where canceling the at least one UL transmission comprises at least partially canceling the at least one UL transmission that was scheduled for transmission during the one or more UL resources.

Aspect 10 is the method of any of aspects 1 to 8, where canceling the at least one UL transmission comprises fully canceling the at least one UL transmission.

Aspect 11 is the method of any of aspects 1 to 10, further including receiving, from the at least one base station, an indication of a cancelation of at least one additional UL transmission, the at least one additional UL transmission corresponding to one or more additional UL resources, the one or more additional UL resources corresponding to one of a subsequent LBT procedure or a prior LBT procedure; determining, based on a priority of the at least one additional UL transmission, not to cancel the at least one additional UL transmission; and transmitting, based on the determination, the at least one additional UL transmission corresponding to the one or more additional UL resources.

Aspect 12 is a method of wireless communication at a base station, including communicating, in a FD mode, with one or more UEs; determining that a LBT procedure associated with DL scheduling will occur via a set of UL resources; and transmitting, to the one or more UEs based on the determination, an indication of a cancelation of one or more UL transmissions during the set of UL resources.

Aspect 13 is the method of aspect 12, where the communication in the FD mode with the one or more UE comprises communication via an unlicensed frequency band.

Aspect 14 is the method of any of aspects 12 and 13, further including performing the LBT procedure via the set of UL resources.

Aspect 15 is the method of any of aspects 12 to 14, where the indication of the cancelation is transmitted via DCI, the DCI including LBT parameter information regarding at least one of at least one time resource, at least one frequency resource, or a LBT configuration associated with the LBT procedure.

Aspect 16 is the method of aspect 15, where the DCI is a group-common DCI that is associated with each UE of the one or more UEs.

Aspect 17 is the method of any of aspects 12 to 16, where the indication of the cancelation is transmitted via one or more of a licensed frequency band or an unlicensed frequency band.

Aspect 18 is the method of any of aspects 12 to 17, where the one or more UL transmissions during the set of UL resources are at least partially canceled or fully canceled.

Aspect 19 is the method of any of aspects 12 to 18, further including transmitting, to the one or more UEs, an indication of a cancelation of at least one additional UL transmission, the at least one additional UL transmission corresponding to one or more additional UL resources, the one or more additional UL resources corresponding to one of a subsequent LBT procedure or a prior LBT procedure; and receiving, from the one or more UEs, the at least one additional UL transmission corresponding to the one or more additional UL resources.

Aspect 20 is an apparatus for wireless communication including at least one processor coupled to a memory and configured to implement a method as in any of aspects 1 to 19.

Aspect 21 is an apparatus for wireless communication including means for implementing a method as in any of aspects 1 to 19.

Aspect 22 is a computer-readable medium storing computer executable code, where the code when executed by a processor causes the processor to implement a method as in any of aspects 1 to 19.

What is claimed is:

1. An apparatus for wireless communication at a user equipment (UE), comprising:
   a memory; and
   at least one processor coupled to the memory and configured to:
   communicate, in a full-duplex (FD) mode, with at least one base station via an unlicensed frequency band;
   receive an indication of at least one scheduled downlink (DL) transmission via the unlicensed frequency band associated with a listen-before-talk (LBT) procedure performed by the at least one base station;
   determine, based on the indication, to cancel at least one uplink (UL) transmission corresponding to one or more UL resources, the one or more UL resources corresponding to the LBT procedure; and
   cancel, based on the determination, the at least one UL transmission corresponding to the one or more UL resources.

2. The apparatus of claim 1, wherein the at least one processor is further configured to receive, from the at least one base station, a second indication of a cancelation of the at least one UL transmission, wherein the at least one UL transmission is canceled based on the received second indication.

3. The apparatus of claim 2, wherein the received second indication includes information associated with at least one of (1) information regarding at least one of one or more time resources, one or more frequency resources, or a LBT configuration associated with the LBT procedure, or (2) a third indication of a set of time-and-frequency resources associated with the LBT procedure.

4. The apparatus of claim 2, wherein the indication is received via group common downlink (DL) control information (DCI).

5. The apparatus of claim 1, wherein the at least one scheduled DL transmission comprises at least a control channel transmission.

6. The apparatus of claim 1, wherein canceling the at least one UL transmission comprises at least partially canceling the at least one UL transmission.

7. The apparatus of claim 6, wherein canceling the at least one UL transmission comprises fully canceling the at least one UL transmission.

8. The apparatus of claim 1, wherein the at least one processor is further configured to:
   receive an additional indication of at least one additional scheduled DL transmission via the unlicensed frequency band associated with an additional LBT procedure performed by the at least one base station;
   determine, based on the additional indication and based on a priority of at least one additional UL transmission, not to cancel the at least one additional UL transmission, wherein the at least one additional UL transmission corresponds to the additional LBT procedure; and
transmit, based on the determination, the at least one additional UL transmission corresponding to the additional LBT procedure.

9. The apparatus of claim 8, wherein the at least one scheduled DL transmission is associated with a first priority, the at least one UL transmission is associated with a second priority, the at least one additional scheduled DL transmission is associated with a third priority, and the priority of the at least one additional UL transmission is a fourth priority, and wherein the at least one processor is further configured to determine to cancel the at least one UL transmission based on a comparison of the first priority and the second priority and to not cancel the at least one additional UL transmission based on a comparison of the third priority and the fourth priority.

10. The apparatus of claim 9, wherein the indication of the at least one scheduled DL comprises the first priority and the indication of the at least one additional scheduled DL transmission comprises the third priority.

11. The apparatus of claim 9, wherein at least one processor is further configured to:
determine the second priority of the at least one UL transmission and the fourth priority of the at least one additional UL transmission.

12. The apparatus of claim 1, wherein the LBT procedure is associated with the unlicensed frequency band.

13. The apparatus of claim 1, further comprising a transceiver coupled to the at least one processor, wherein the transceiver is configured to receive the indication via a licensed frequency band.

14. An apparatus for wireless communication at a base station, comprising:
a memory; and
at least one processor coupled to the memory and configured to:
communicate, in a full-duplex (FD) mode, with one or more user equipments (UEs) via an unlicensed frequency band;
determine that a listen-before-talk (LBT) procedure associated with a scheduled downlink (DL) transmission is scheduled to occur via a first set of resources corresponding to a second set of resources associated with one or more potential uplink (UL) transmissions from the one or more UEs; and
transmit, to the one or more UEs based on the determination, an indication of a cancelation of the one or more potential UL transmissions.

15. The apparatus of claim 14, wherein the at least one processor is further configured to:
perform the LBT procedure via the first set of resources.

16. The apparatus of claim 14, wherein the indication of the cancelation is transmitted via DL control information (DCI), the DCI comprising LBT parameter information regarding at least one of at least one time resource, at least one frequency resource, or a LBT configuration associated with the LBT procedure.

17. The apparatus of claim 16, wherein the DCI is a group-common DCI that is associated with each UE of the one or more UEs.

18. The apparatus of claim 14, wherein the indication of the cancelation is transmitted via one or more of a licensed frequency band or the unlicensed frequency band.

19. The apparatus of claim 14, wherein the one or more potential UL transmissions during the set of UL resources are at least partially canceled or fully canceled.

20. The apparatus of claim 14, further comprising a transceiver coupled to the at least one processor, wherein the transceiver is configured to:
transmit, to the one or more UEs, an additional indication of a cancelation of at least one additional UL transmission associated with a third set of resources, the third set of resources corresponding to one of a subsequent LBT procedure or a prior LBT procedure associated with an additional scheduled DL transmission; and
receive, from the one or more UEs, the at least one additional UL transmission via the third set of resources.

21. The apparatus of claim 20, wherein the at least one additional scheduled DL transmission is associated with a first priority and the at least one additional UL transmission is associated with a second priority wherein the transceiver is configured to receive the at least one additional UL transmission based on the second priority being a higher priority than the first priority.

22. A method of wireless communication at a user equipment (UE), comprising:
communicating, in a full-duplex (FD) mode, with at least one base station via an unlicensed frequency band;
receiving an indication of at least one scheduled downlink (DL) transmission via the unlicensed frequency band associated with a listen-before-talk (LBT) procedure performed by the at least one base station;
determining, based on the indication, to cancel at least one uplink (UL) transmission corresponding to one or more UL resources, the one or more UL resources corresponding to the LBT procedure; and
canceling, based on the determination, the at least one UL transmission corresponding to the one or more UL resources.

23. The method of claim 22, further comprising receiving, from the at least one base station, a second indication of a cancelation of the at least one UL transmission, wherein the at least one UL transmission is canceled based on the received second indication.

24. The method of claim 23, wherein the received second indication includes information associated with at least one of (1) information regarding at least one of one or more time resources, one or more frequency resources, or a LBT configuration associated with the LBT procedure, or (2) a third indication of a set of time-and-frequency resources associated with the LBT procedure.

25. The method of claim 23, wherein the at least one scheduled DL transmission comprises at least a control channel transmission.

26. The method of claim 22, further comprising:
receiving an additional indication of at least one additional scheduled DL transmission via the unlicensed frequency band associated with an additional LBT procedure performed by the at least one base station;
determining, based on the additional indication and based on a priority of at least one additional UL transmission, not to cancel the at least one additional UL transmission, wherein the at least one additional UL transmission corresponds to the additional LBT procedure; and
transmitting, based on the determination, the at least one additional UL transmission corresponding to the additional LBT procedure.

27. A method of wireless communication at a base station, comprising:
communicating, in a full-duplex (FD) mode, with one or more user equipments (UEs) via an unlicensed frequency band;

determining that a listen-before-talk (LBT) procedure associated with a scheduled downlink (DL) transmission is scheduled to occur via a first set of resources corresponding to a second set of resources associated with one or more potential uplink (UL) transmissions from the one or more UEs; and transmitting, to the one or more UEs based on the determination, an indication of a cancelation of the one or more potential UL transmissions.

28. The method of claim 27, further comprising:
performing the LBT procedure via the first set of resources.

29. The method of claim 27, wherein the indication of the cancelation is transmitted via DL control information (DCI), the DCI comprising LBT parameter information regarding at least one of at least one time resource, at least one frequency resource, or a LBT configuration associated with the LBT procedure.

30. The method of claim 29, wherein the DCI is a group-common DCI that is associated with each UE of the one or more UEs.

\* \* \* \* \*